United States Patent
Bruce et al.

(10) Patent No.: US 9,423,146 B2
(45) Date of Patent: Aug. 23, 2016

(54) HVAC CONTROLLER HAVING INTEGRATED COMFORT WINDOW DISPLAY

(71) Applicants: Bradley Steve Bruce, Fort Worth, TX (US); Daniel James Walter, Midlothian, TX (US)

(72) Inventors: Bradley Steve Bruce, Fort Worth, TX (US); Daniel James Walter, Midlothian, TX (US)

( * ) Notice: Subject to any disclaimer, the term of this patent is extended or adjusted under 35 U.S.C. 154(b) by 649 days.

(21) Appl. No.: 13/804,977

(22) Filed: Mar. 14, 2013

(65) Prior Publication Data

US 2014/0277756 A1    Sep. 18, 2014

(51) Int. Cl.

| | |
|---|---|
| *G05B 13/00* | (2006.01) |
| *G05B 15/00* | (2006.01) |
| *G05D 23/00* | (2006.01) |
| *F24F 3/14* | (2006.01) |
| *F24F 11/00* | (2006.01) |
| *F24F 7/00* | (2006.01) |
| *G08B 23/00* | (2006.01) |
| *G08C 15/06* | (2006.01) |
| *G05D 22/02* | (2006.01) |

(Continued)

(52) U.S. Cl.
CPC ........ *F24F 11/0086* (2013.01); *F24F 11/0012* (2013.01); *F24F 11/0015* (2013.01); *F24F 11/0017* (2013.01); *G05D 22/02* (2013.01); *G05D 23/1902* (2013.01); *G05D 27/02* (2013.01); *F24F 2011/0064* (2013.01); *F24F 2011/0075* (2013.01); *Y02B 30/78* (2013.01)

(58) Field of Classification Search
CPC ....... F24D 12/02; F23N 5/203; G05B 15/02; G05B 13/02; G05D 22/02; G05D 23/00; G06F 1/26; G06F 8/34; G06Q 10/00; G06Q 30/00; G06Q 30/06; G06Q 50/06; G08B 21/20; H04L 12/02
USPC .............................. 706/12; 236/94, 51; 62/93
See application file for complete search history.

(56) References Cited

U.S. PATENT DOCUMENTS

| | | |
|---|---|---|
| 7,142,948 B2 | 11/2006 | Metz |
| 7,222,494 B2 | 5/2007 | Peterson et al. |

(Continued)

OTHER PUBLICATIONS

Thermal_HVAC_humidity_psychometric.jpg <Retrieved on Nov. 16, 2012 From: sustainabilityworkshop.autodesk.com/sites/default/files/.../Thermal_HVAC_humidity_psychometric.jpg>.

*Primary Examiner* — Mohammad Ali
*Assistant Examiner* — Md Azad
(74) *Attorney, Agent, or Firm* — Law Office of Sam Sokhansanj PLLC

(57) ABSTRACT

A device configured to control one or more components of an HVAC system. The device includes a display, a controller in communication with the display, and wherein the controller is configured to receive one or more user defined environmental settings. Further, the controller communicates with one or more environmental sensors, wherein the environmental sensors detect one or more environmental conditions. In addition, the controller is further configured to provide a visual indication on the display for the detected environmental conditions with respect to the user defined environmental settings. This visual indication includes one or more bounded region having an interior space indicative of user comfort level, wherein the bounded regions have one or more borders, and wherein the borders at least partially represent the user defined environmental settings. In addition, the visual indication includes one or more icons that represents the detected environmental conditions and are displayed in relation to the bounded regions.

23 Claims, 16 Drawing Sheets

(51) Int. Cl.
*G05D 23/19* (2006.01)
*G05D 27/02* (2006.01)

(56) References Cited

U.S. PATENT DOCUMENTS

| | | | |
|---|---|---|---|
| 7,475,828 B2 | 1/2009 | Bartlett et al. | |
| 8,091,796 B2 | 1/2012 | Amundson et al. | |
| 8,174,381 B2 | 5/2012 | Imes et al. | |
| 8,196,185 B2 | 6/2012 | Geadelmann et al. | |
| 8,356,760 B2 | 1/2013 | Riley, Jr. | |
| 2004/0245352 A1* | 12/2004 | Smith | 236/94 |
| 2004/0262410 A1 | 12/2004 | Hull | |
| 2008/0217419 A1* | 9/2008 | Ehlers et al. | 236/44 C |
| 2009/0143916 A1* | 6/2009 | Boll et al. | 700/276 |
| 2012/0221718 A1 | 8/2012 | Imes et al. | |
| 2012/0228393 A1 | 9/2012 | Storm et al. | |
| 2012/0253523 A1 | 10/2012 | Harrod et al. | |
| 2012/0273581 A1 | 11/2012 | Kolk et al. | |
| 2013/0087630 A1 | 4/2013 | Castillo et al. | |
| 2013/0090767 A1* | 4/2013 | Bruck et al. | 700/276 |

\* cited by examiner

HVAC CONTROLLER HAVING INTEGRATED COMFORT WINDOW DISPLAY

FIELD OF THE INVENTION

A user friendly HVAC controller that allows a user to dynamically, graphically, and visually view current comfort conditions, set comfort settings such as temperature and humidity, and control comfort conditions, among other features.

BACKGROUND

Heating, ventilation, and/or air conditioning (HVAC) systems are often used to control the comfort level within a building or other structure. Many HVAC systems include a controller that activates and deactivates one or more HVAC components of the HVAC system to affect and control one or more environmental conditions within the building. These environmental conditions can include, but are not limited to, temperature, humidity, and/or ventilation. In many cases, such HVAC controllers may include, or have access to, one or more environmental sensors, and may use parameters provided by the one or more sensors to control the one or more HVAC components to achieve desired programmed or set environmental conditions. Interaction with the user interface can often prove difficult, discouraging many users from attempting to program the controller to run on a schedule, viewing how the controller is operating within preset parameters, or observing the controller's efficiency or when it is conserving energy. The increased complexity of such modern HVAC controllers, programming and/or operating such devices can be considered difficult and/or confusing, particularly for novice and/or non-technical users. Thus, there is a need for HVAC controllers that are more intuitive and user friendly to program and operate. There is also a need to be able to see current comfort conditions, which include temperature and humidity, quickly and more precisely in order to get a better feel for comfort at a glance. Furthermore, there is a need to be able to program and control HVAC controllers in terms of comfort levels, which includes more than just temperature, rather than simply to program and control HVAC controllers with temperature alone.

BRIEF SUMMARY OF THE INVENTION

The present invention relates to HVAC thermostats or HVAC controllers that are configured to be more intuitive and user friendly to program and operate.

The present invention provides, in one aspect, a device configured to control one or more components of an HVAC system. The device includes a display, a controller in communication with the display, and wherein the controller is configured to receive one or more user defined environmental settings. Further, the controller communicates with one or more environmental sensors, wherein the environmental sensors detect one or more environmental conditions. In addition, the controller is further configured to provide a visual indication on the display for the detected environmental conditions with respect to the user defined environmental settings. This visual indication includes one or more bounded regions having an interior space indicative of user comfort level, wherein the bounded regions have one or more borders, and wherein the borders at least partially represent the user defined environmental settings. In addition, the visual indication includes one or more icons that represents the detected environmental conditions and are displayed in relation to the bounded regions.

The present invention provides, in another aspect, a method of controlling a HVAC system. The method includes receiving one or more first environmental conditions, programming one or more second environmental conditions, and controlling one or more components of the HVAC system. Further, the controlling depends at least partially on the received first environmental conditions and programmed second environmental conditions, and wherein the controlling is at least partially represented in a graphical display. The graphical display includes one or more substantially bounded regions, wherein the configuration of the bounded regions is at least partially defined by the second environmental conditions. In addition, the location of the one or more icons is at least partially defined by the first environmental conditions.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
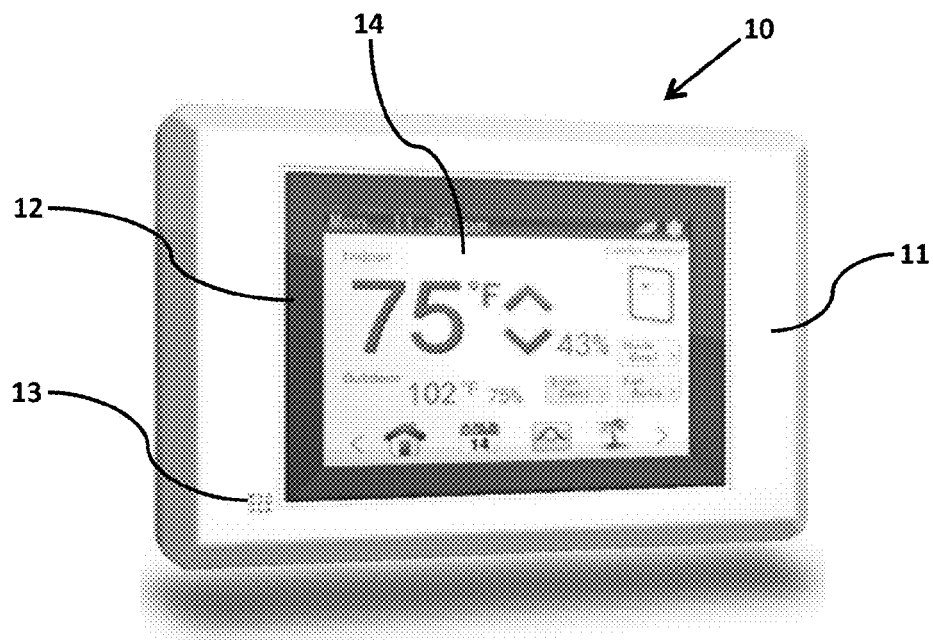
FIG. 1 provides an illustrative but non-limiting perspective view of the controller.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Phrases and terms similar to "software", "application", "algorithm", and "firmware" may include any non-transitory computer readable medium storing thereon a program, which when executed by a computer, causes the computer to perform a method or function.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code in the form of computer-executable instructions or data structures and which can be accessed by a general purpose or special purpose computer.

Phrases and terms similar to "environment", "environmental", "environmental conditions" or "environmental settings" may include temperature, dry bulb temperature, wet bulb temperature, humidity, relative humidity, heat index, wind speed, precipitation, dust, rain fall, snow, blizzard, tornado, hurricane, weather forecast, atmospheric pressure, air quality, chemical levels or content, and foreign particle levels or content.

Figure 12:
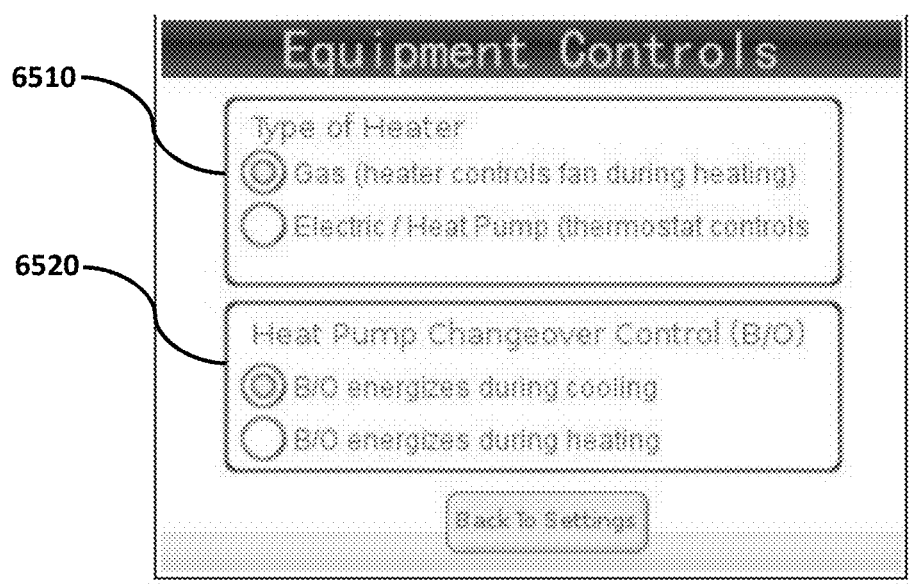
FIG. 12 provides an illustrative but non-limiting example of the equipment controls display.

FIG. 1 is a perspective view of an HVAC controller 10 of the present invention. In one embodiment, HVAC controller 10 is a thermostat, but this is not required. In particular, controller 10 has a frame 11 further enclosing a bezel 12 and a user interface display 14. Controller 10 further includes a speaker area 13. Alternatively, area 13 can be used as an environmental sensor for sensing environment conditions, such as temperature and/or humidity. However, it is contemplated within the scope of the invention that controller 10 can be in communication to receive or send information and data to one or more environmental sensors located on the controller or remotely from the controller, and either directly wired or wirelessly communicating with controller 10. These environmental sensors can include one or more of temperature, dry bulb temperature, wet bulb temperature, humidity, relative humidity, wind speed, and air quality, among others. In the current embodiment, controller 10 can include one or more processors adapted to operate in accordance with an algorithm that controls or at least partially controls one or more components of an HVAC system, interpret readings from the environmental sensors, and can visually depict or display various text or graphics on the controller, including the Comfort Window display, which will be described in further detail. In some instances, the algorithm can include a number of operating parameters. Examples of components that can be controlled by controller 10 include one or more of a furnace, a boiler for hot water heat or steam heat, a heat pump, an air conditioning unit, a humidifier, a dehumidifier, an air exchanger, an air cleaner, a system fan or fans, dampers for channeling air through ducting (including the potential for using dampers in conjunction with solar collectors and heat exchangers, etc.) or other purposes, and the like. For example, in one embodiment shown in FIG. 12, controller 10 allows the user to designate a type of heater 6510 and heat pump change over control 6520 to be used with the controller. In other embodiments, controller 10 can operate in accordance with an algorithm that provides temperature set points, starting and/or ending times, and the like.

It is contemplated within the scope of the invention that controller 10 can also be any computer implemented method, software, application, firmware, or tangible non-transitory computer readable medium. Further, controller 10 can be incorporated on any computing device, such as a personal desktop computer, laptop computer, smart phone, mobile phone, tablet computer, or personal digital assistant, which may or may not be physically connected to the HVAC system. Instead, the controller 10 can be configured to control the components of the HVAC system by a remote connection such as over a network, internet, through a wireless interface, or other communication medium. Here, the controller 10 can control the HVAC system by communicating to an intermediate device, access node, or gateway that can physically connected to the HVAC system. Further, the aforementioned computing device on which controller 10 is incorporated also may or may not be physically connected to environmental sensors. Again, controller 10 can communicate with the environmental sensors through a remote connection, such as a network, internet, or wireless interface.

User interface 14 can be any suitable interface that permits controller 10 to display and/or solicit information as well as permitting a user to enter data such as temperature set points, humidity set points, starting times, ending times, and the like. In some cases, user interface 14 can be a touchscreen display that function's as both a display and keypad or user input device. A display can be any suitable alphanumeric display. In some instances, a display can include or may be a liquid crystal display (LCD), high performance addressing display (HPA), thin film transistor display (TFT), light emitting diode (LED), organic light emitting diode (OLED), or an image (or moving image) projector. In the current embodiment, the touch screen panel can be adapted to solicit values for a number of operating parameters and/or to receive said values. In addition, the display screen may provide haptic feedback to a user. In another embodiment, the controller 10 may not have a user interface directly on the controller 10 itself, but rather the controller 10 may only communicate remotely to other devices that provide the user interface for the user. For example, the controller 10 may communicate wirelessly over the internet to a central server, which in turn may communicate to a smartphone, tablet or computer and the smartphone, tablet or computer can provide the user interface to the user, which would include both the display (such as an LCD) and the user input device (such as a touchscreen). The smartphone, tablet or computer can further contain software that would provide for the same or similar user input and display functionality as is described herein below.

HVAC controller 10 can include a memory unit (not shown) that may be used to store any desired information, such as the aforementioned control algorithm, set points, and the like. Controller 10 can store information within memory unit and can subsequently retrieve the stored information. The memory unit may be any suitable type of storage device, such as RAM, ROM, EPROM, a flash drive, a hard drive, and the like. The controller can also include a graphics controller for driving and controlling the display and user interface.

In other embodiments, HVAC controller 10 can include a data port (not shown). The data port can be configured to communicate with controller 10 and may, if desired, be used to either upload information to controller 10 or to download information from controller 10. Information that can be uploaded or downloaded may include values of operating parameters. In some instances, the data port may be used to upload a previously created thermostat configuration into controller 10, thereby hastening the programming process. In some cases, the data port can be used to download a thermostat configuration that has been created using controller 10, so that the thermostat configuration may be used in other thermostats. In some cases, the data port can be used to upload and/or download information pertaining to an HVAC dealer or contractor. Further, the data port can be a wireless port such as a Bluetooth® port or any other wireless protocol, such as 802.11, or radio frequency (RF). In some cases, the data port can be a wired port such as a serial port, a parallel port, a CAT5 port, a USB (universal serial bus) port, or the like. In some instances, the data port may be a USB port and can be used to download and/or upload information from a USB flash drive. Other storage devices can also be employed, as desired. In addition, the data port can wirelessly connect to the Internet, intranet, or other related wide area network (WAN), local area network (LAN), personal area network (PAN), campus area network (CAN), or metropolitan area network (MAP), or other wireless access point (WAP). Further, the data port can access, upload, and download information from one or more remote servers.

Figure 2:
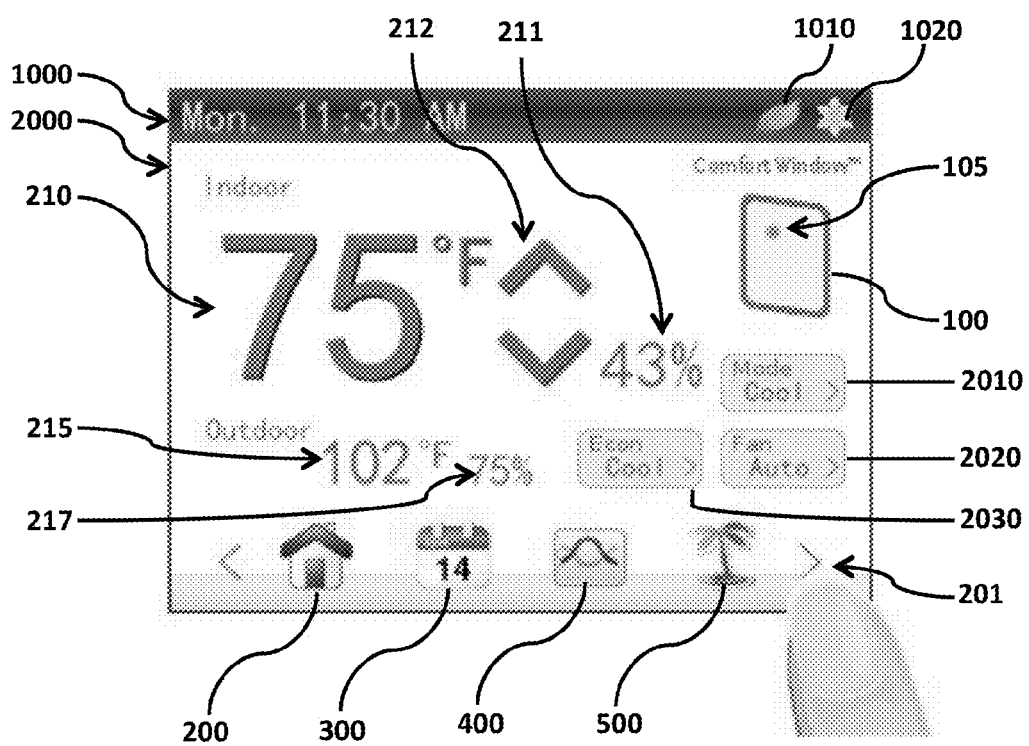
FIG. 2 provides an illustrative but non-limiting example of a home screen.

Referring now to FIG. 2, a user interface display is shown for a home screen 2000 for controller 10. In particular, a top header region 1000 displays items such as date and time, and also notifications, such as whether an Economizer feature is currently running (notification 1010) and whether the Compressor is currently running (notification 1020), among others. Home screen 2000 further can display the current indoor temperature 210, current indoor humidity reading 211, current outdoor temperature 215, and current outdoor humidity reading 217. Further, up/down arrows 212 allow the current temperature set points to be manually configured by a user by pressing the respective arrows on the screen. Home screen 2000 further displays a user-friendly modified psychrometric graph 100, referred to herein as "Comfort Window", that provides a visual indication of a comfort zone for a particular user and a graphical display of the current condition point, node 105. Various embodiments of the Comfort Window as shown in FIG. 2 and FIGS. 3A-3H will be described in further. In addition, the term "Comfort Window" can be referred to herein in abbreviated format "CW" throughout this entire disclosure.

Figure 3A:
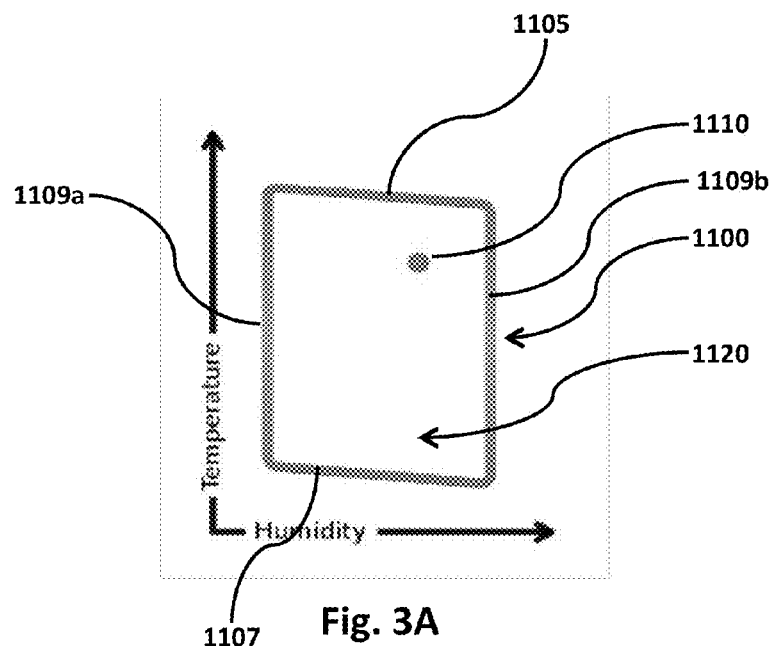
FIG. 3A provides an illustrative but non-limiting example of an integrated comfort window display.
Figure 3B:
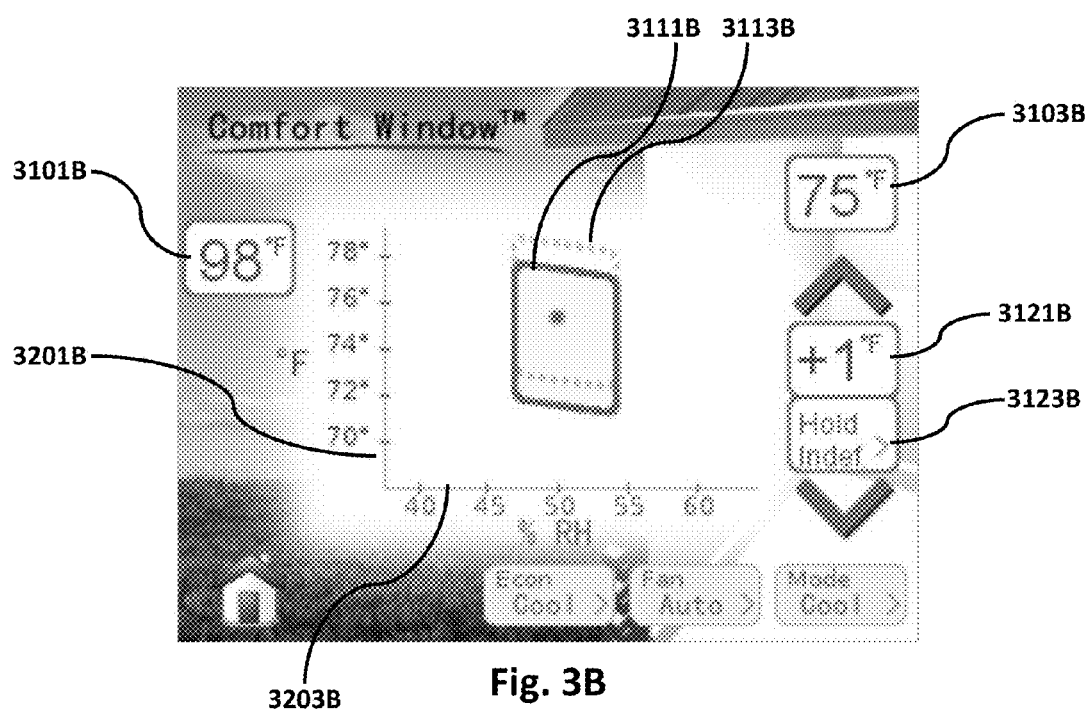
FIGS. 3B-3H provide an illustrative but non-limiting example of the comfort window override functionality.

FIG. 3A illustrates a diagram of one embodiment of a Comfort Window 1100 displayed on the controller, wherein CW 1100 is plotted on a graph wherein the x-axis represent relative humidity and the y-axis represents temperature. For example, possible humidity and temperatures ranges for x and y graph are shown in FIG. 3B, in y-axis 3201B and x-axis 3203B. In embodiment, these ranges can also be explicitly shown on the x and y graph in FIG. 3A. Referring to FIG. 3A, node 1110 indicates the current indoor dry bulb temperature and relative humidity obtained from one or more temperature and humidity or environmental sensors and displayed with respect to the Comfort Window settings in FIG. 7. In other embodiments, additional nodes or graphical icons can be overlaid on Comfort Window 1100 to indicate various other types of indoor or outdoor temperatures, humidity, calculations, and measurements, including but not limited to, energy savings data, length of time the economizer feature has run over a set period of time, and a "Feels-Like" temperature. The "Feels-Like" temperature will be described in further detail within this disclosure. CW 1100 forms a bounded box having interior area 1120, wherein area 1120 can represent user comfort level or user comfort zone. According to the current embodiment of the invention, as long as node 1110 is within the bounded box of CW 1100 then the user is considered to be within his or her comfort limits for indoor temperature and humidity settings. In addition, the controller can operate one or more components of the HVAC system in order to keep node 1110 within area 1120. Alternatively, the controller can operate one or more components of the HVAC system to keep node 1110 within area 1120 under certain conditions, such as when node 1110 is within close proximity (such as a pre-defined tolerance) to boundary 1107 of CW 1100, or when node 1110 comes into contact with boundary 1107 of CW 1100, or when node 1110 moves outside or partially outside of bounded 1107 of CW 1100. Downward sloping lines 1105 and 1107 indicate a similar change in temperature across similar humidity ranges that one would expect from an equivalent "Feels-Like" temperature given the humidity range across the sloping section on the comfort window humidity axis, which form the upper and lower boundaries of CW 1100. In the current embodiment, node 1100 is portrayed as a circular filled icon, however, it is contemplated within the scope of the invention that node 1110 may be any symbol or graphical icon, taking any shape, dimensions, or color, whether in two-dimensions or three-dimensions. Further, such graphical icons include, but are not limited to a dot, circle, oval, ellipsoid, square, box, rectilinear shape, pyramid, any polygon having three or more sides, photo, pictures, images, videos, or computer generated animations. In addition, it is contemplated within the scope of the invention that the controller is not limited to one CW 1100 or current condition node 1110, and can include one or more Comfort Windows and current condition nodes or icons on a single display of the controller or alternatively a plurality of Comfort Windows and current conditions nodes or icons displayed on a plurality of displays. In addition, the one or more CW's and nodes can be displayed on the home screen or any other screen.

In another embodiment, historical information can be added to the Comfort Window graph, by adding a trailing tail visualization of node 1110 wherein the trailing tail fades over time, wherein the trailing tail acts to make the current conditions linger on the Comfort Window graph for the purpose of viewing past conditions on the same graph shown in FIG. 3A. Such a node movement history that can be shown by a line that follows node 1110 would fade over time, for example, fully disappearing after 12 hours or alternatively over a customizable or settable time frame. In yet another embodiment, either a text-based time indicator or a moving dot across a timeline can be added to node 1110, CW 1100, and graph 3113B to show historical information relating to where the current condition node 1110 was in relation to both the Comfort Window 1100 settings and any override, whether by manual override or by program entry override at past.

Referring back to FIG. 2, Comfort Window 100 represents a quick-view comfort window similar to 1100 except that in lieu of "to-scale" x and y axes, the "quick-view" Comfort Window 100 can give a simplified view of the Comfort Window for the purpose of conveying comfort information at a glance. Here, the bounded regions of CW 100 can generally represent at least partially the user defined environmental settings, such as temperature and relative humidity, and node 105 can generally represents current detected environmental conditions, such as temperature and humidity. In one embodiment displaying the "quick view" format of CW 100, the bounding diagonal lines and vertical lines on CW 100 do not change size or shape, regardless of any CW settings that the user changes, such as in FIG. 7. Nor do these lines change size or shape due to the relative distance of the actual location of the node 105 with respect to the magnitude of the height or width of the CW 100 boundary lines. However, whenever the current condition node 105 is within the boundary lines of the CW 100 as set by the settings specified in FIG. 7, node 105 is appropriately scaled within the boundaries of the CW 100. However, again in this embodiment, whenever node 105 falls outside of the boundaries of CW 100, node 105 does not cause the size or shape of the boundaries of CW 100 to change, even if the current position of the node 105 would normally have necessitated a change to the boundaries due to the usual need to scale the distance between the node 105 to the distance of the magnitude of the boundary lines themselves, as specified in FIG. 7. In this embodiment, CW 100 is intended to be a quick-view alternative to other types of embodiments, as shown for example in FIG. 3A. However, in other embodiments, the CW 100 can also be displayed "to scale", wherein its bounded regions change depending on the user defined Comfort Window settings, as specified in FIG. 7, and the current position of the node 105 can also modify the bounded regions of CW 100, and wherein CW 100 can take any size, shape, or dimension.

Figure 7:
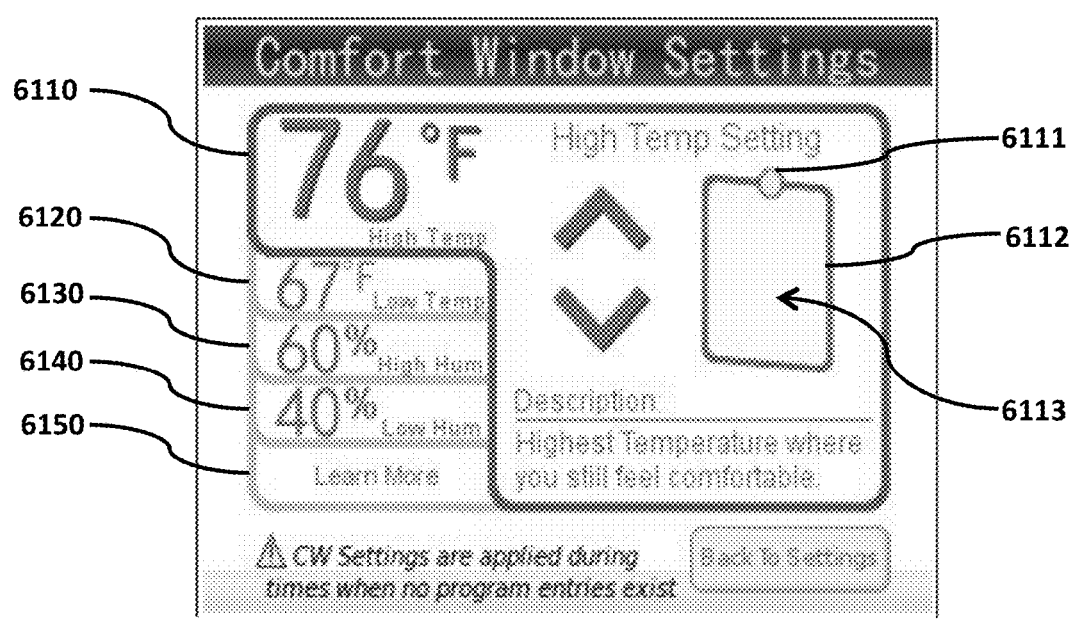
FIG. 7 provides an illustrative but non-limiting example of the comfort window settings menu display.

Referring now to FIG. 7, which illustrates one embodiment for the user to define or program various Comfort Window settings which can set the parameters for visually displaying the Comfort Window illustrated in FIGS. 2 and 3A-3H, and setting the parameters for the controller 10 to further control one or more components of the HVAC system. Specifically, the user is provided with the option to set the high temperature CW set point via module 6110, low temperature CW set point via module 6120, high humidity CW set point via module 6130, and low humidity CW set point via module 6140. In addition, the user is presented with a help module 6150. Help module 6150 can guide the user in setting the appropriate or recommended parameters, tips, and instructions.

Still referring to FIG. 7, the user can manually raise or lower the high temperature set point via module 6110, thereby setting the upper limit which provides the basis for a global upper limit dry bulb temperature setting range. Similar to high temperature setting module 6110, the low temperature set point via module 6120 also allows the user to set the lower temperature limit, which provides a basis for a global lower limit temperature setting range. Similar to modules 6110 and 6120, the high humidity set point via module 6130 allows the user to manually set global upper limit relative humidity percentage, which provides a basis for a global upper limit relative humidity setting range. Similar to modules 6110, 6120, and 6130, the low humidity set point via module 6140 allows the user to manually set global lower limit humidity percentage, which provides a basis for a global lower limit relative humidity setting range. In one embodiment, the high temperature set point at least partially defines the upper boundary line 1105 or top x-y coordinates of Comfort Window 1100, the low temperature set point at least partially defines the lower boundary line 1107 or bottom x-y coordinates of CW 1100, the low relative humidity set point at least partially defines the left boundary line 1109a or left most x-y coordinates of CW 1100, and the high relative humidity set point at least partially defines the right boundary line 1109b or the right most x-y coordinates of CW 1100. In this embodiment, the combination of the high temperature setpoint, low temperature set point, high relative humidity set point, and low relative humidity set point at least partially or substantially define the configuration and bounding regions of CW 1100.

Still referring to FIG. 7, in one embodiment, module 6110 provides the user a static image of a Comfort Window 6112 along with a static temperature or humidity setting node 6111 to help visually show the user to what setting the numerical value either of modules 6110, 6120, 6130, or 6140 applies. In another embodiment, node 6111 may be replaced with the combination of a y-axis and a semi-transparent or dotted line that is extended to the left or right of the CW image 6112 onto the y-axis to signify where on the temperature or humidity axis either the high/low temperature setting or high/low humidity settings in either of modules 6110, 6120, 6130, and 6140 applies, for example, in the middle of the slanted comfort window lines. In another embodiment, various areas on or around the borders of CW 6112 can be highlighted as the user is setting the set points for either of modules 6110, 6120, 6130, and 6140. In another embodiment, modules 6110, 6120, 6130, and 6140 may additionally provide the user an image of a CW 6112 along with a current temperature and humidity node, not shown in FIG. 7 but similar to node 1110 in FIG. 3A, to provide the user the ability to visually observe the upward and downward movement of the current condition node as it dynamically moves in relation to the set points for each of modules 6110, 6120, 6130, and 6140. In this embodiment, the user can also visually observe to see if the current condition node is within the comfort limits of temperature and humidity as the user is manually adjusting either of the high/low temperature setpoint and high/low humidity setpoint in modules 6110-6140 in order to visually observe that the current condition node falls within or outside the comfort area 6113 of CW 6112. In another embodiment, any of the borders, bounding regions, or entire CW 6112 can dynamically adjust and move as either of the setpoints for temperature and humidity are programmed within modules 6110-6140.

In another embodiment for programming settings on the HVAC controller, the user may be allowed to manually move CW 100, CW 1100, CW 3111B, or CW 6112 by touch, cursor, mouse, hand, or eye gestures, thereby visually and dynamically setting the high and low temperature set points and high and low relative humidity set points for the Comfort Window. For example, the user may move CW 1100 or CW 6112 by touching the middle of the box to drag it upwards or downwards along the y-temperature axis, or laterally along the x-humidity axis. In another embodiment, the user can also move the boundaries of CW 1100 or CW 6112 by touching one or more borders of CW 1100 or CW 6112 and slightly dragging them either in the x-axis or y-axis across the display to increase or decrease the size, shape, and/or dimensions of CW 1100 or CW 6112. Further, CW 1100 or CW 6112 may be shown in three-dimensions (3D), including movement in a z-axis. In other embodiments, the HVAC controller may provide a user with various pre-defined template Comfort Windows or user-defined template Comfort Windows. These pre-defined or user-defined template Comfort Windows may be downloaded into the controller from a remote server or computing device or factory pre-installed. Further, the aforementioned template Comfort Windows can take any size, shape, color, or dimension and can further be suited for different times of season. For example, the template windows can be rectangular, square, triangular, oval, circular, or any polygon having three or more sides. The template windows may take on a rectilinear or parallelogram configuration. In addition, they can be graphic images or moving images. They may also be non-linear in a fashion that follows various other methods known in the art that purport to find the precise delineation between comfort and non-comfort across the temperature/humidity plane.

The following illustrate a system of equations and rules in various embodiments for calculating enthalpy measurements, heat index measurements, boundaries of the Comfort Window (CW), and the "Feels-Like" temperatures referred to herein within this disclosure.

Specifically, there are two methods for calculating enthalpy. For the first enthalpy measurement method, a simplifying assumption is made, followed by a series of calculations. By definition, the degree of saturation of air can be calculated using Equation 12 from Chapter 6 of the ASHRAE Handbook of Fundamentals, 2001, ASHRAE Handbook: Fundamentals, American Society of Heating, Refrigerating, and Air-Conditioning Engineers: Atlanta, Ga., 2001, incorporated herein by reference, and which is outlined below:

$$\mu = \frac{W}{W_s} \tag{1}$$

Where:
$\mu$=Degree of saturation in %
W=Specific humidity at a given temperature and pressure in $lb_{water}/lb_{dry\ air}$
$W_s$=Specific humidity at saturation at the given temperature and pressure in $lb_{water}/lb_{dry\ air}$
However, the degree of saturation and relative humidity are approximately the same at temperatures below 100° F. This simplifying assumption is then applied to equation (1) by substituting relative humidity for $\mu$, obtaining values for $W_s$ from a psychometrics chart, and calculating W. Therefore, from rewriting equation (1) we get the following:

$$W = \%\ RH \times W_s \tag{2}$$

Where:
W=specific humidity (lbwater/lbdry air)
% RH=relative humidity of the air
Ws=specific humidity at saturation (lbwater/lbdry air).

Finally, enthalpy is calculated using Equation 32 from Chapter 6 of the 2001 ASHRAE Handbook of Fundamentals, which includes the following:

$$H = (0.24 \times T) + [W \times (1061 + 0.444 \times T)] \tag{3}$$

Where:
H=enthalpy (Btu/lb)
T=dry-bulb temperature (° F.)
W=specific humidity (lbwater/lbdry air)–given from Humidity Sensor.

The second method of calculating enthalpy will now be described in the following equations and TABLE 1:

$$h = ha + W \times hw \tag{4}$$

Where h=enthalpy $$ha\ \text{(specific enthalpy of dry air)} = Cpa \times T \tag{5}$$

Where Cpa=specific heat of air;
T=temperature $$hw\ \text{(specific enthalpy of water vapor)} = Cpw \times T + hwe \tag{6}$$

Where
Cpw=specific heat of water vapor;
T=temperature;

$$W\ \text{(humidity ratio)} = 0.6219(pv/pa) = 0.6219(\emptyset ps/(P - \emptyset ps)) \tag{7}$$

Where
$\emptyset$=Relative Humidity (from Humidity Sensor);
pv=partial pressure of the water vapor in (non-saturated) mixture of air;
ps=partial pressure of water vapor in a saturated mixture of air (from TABLE 1)

$$P = 14.696\ \text{at sea level (1 atm of pressure)} \tag{8}$$

$$h = 0.24T + W(1061.2 + 0.444T) \tag{10}$$

$$h = 0.24T + 0.6219 \times \emptyset \times ps/(14.696 - (\emptyset \times ps)) \times (1061.2 + 0.444T) \tag{11}$$

TABLE 1

| Temp (° F.) | ps |
|---|---|
| 40 | 0.122 |
| 41 | 0.1276 |
| 42 | 0.1332 |
| 43 | 0.1388 |
| 44 | 0.1444 |
| 45 | 0.15 |
| 46 | 0.1556 |
| 47 | 0.1612 |
| 48 | 0.1668 |
| 49 | 0.1724 |
| 50 | 0.178 |
| 51 | 0.1858 |
| 52 | 0.1936 |
| 53 | 0.2014 |
| 54 | 0.2092 |
| 55 | 0.217 |
| 56 | 0.2248 |
| 57 | 0.2326 |
| 58 | 0.2404 |
| 59 | 0.2482 |
| 60 | 0.256 |
| 61 | 0.2667 |
| 62 | 0.2774 |
| 63 | 0.2881 |
| 64 | 0.2988 |
| 65 | 0.3095 |
| 66 | 0.3202 |
| 67 | 0.3309 |
| 68 | 0.3416 |

TABLE 1-continued

| Temp (° F.) | ps |
|---|---|
| 69 | 0.3523 |
| 70 | 0.363 |
| 71 | 0.3774 |
| 72 | 0.3918 |
| 73 | 0.4062 |
| 74 | 0.4206 |
| 75 | 0.435 |
| 76 | 0.4494 |
| 77 | 0.4638 |
| 78 | 0.4782 |
| 79 | 0.4926 |
| 80 | 0.507 |
| 81 | 0.5262 |
| 82 | 0.5454 |
| 83 | 0.5646 |
| 84 | 0.5838 |
| 85 | 0.603 |
| 86 | 0.6222 |
| 87 | 0.6414 |
| 88 | 0.6606 |
| 89 | 0.6798 |
| 90 | 0.699 |
| 91 | 0.7241 |
| 92 | 0.7492 |
| 93 | 0.7743 |
| 94 | 0.7994 |
| 95 | 0.8245 |
| 96 | 0.8496 |
| 97 | 0.8747 |
| 98 | 0.8998 |
| 99 | 0.9249 |
| 100 | 0.95 |
| 101 | 0.9826 |
| 102 | 1.0152 |
| 103 | 1.0478 |
| 104 | 1.0804 |
| 105 | 1.113 |
| 106 | 1.1456 |
| 107 | 1.1782 |
| 108 | 1.2108 |
| 109 | 1.2434 |
| 110 | 1.276 |

The following illustrates a method of calculating the "Feels-Like" temperature for the controller:

Feels-Like Temp=Heat Index calculation using following formula (12):
  when Temp>=80°, RH>=40%

Feels-Like Temp=Heat Index calculation using following formula (13):
  when 70°<=Temp<=80°, RH<=80%
  or when Temp>=80°, RH<40%

Feels-Like Temp=Approximate Heat Index using continuing trends and linear interpolation in ranges where no known-good Heat Index formulas exist according to the following:
  when 60°<Temp<70°
  or when (70°<=Temp<=80°, RH>80%)
  or when (Temp<80°, RH<40%).

FeelsLike Temp=Temp
  when Temp<60°

In one embodiment, the controller of the present invention may use Outdoor Wind Speed Factors to compute Feels-Like Temperature for Low Temperatures (<60°) for Outdoor Temperature. For example, the Outdoor Wind Speed Factors may be submitted in real time from a central server or over the world wide web to the controller.

The following illustrates a method for calculating the Heat Index (HI):

The following formula (12) is the most widely used formula for calculating the Heat Index. It is an Approximation with an error of plus or minus 1.3° F. Generally, formula (12) is good for temperatures of 80° F. or more and RH of 40% or more.

$$HI = c1 + c2(T) + c3(R) + c4(T)(R) + c5(T^2) + c6(R^2) + c7(T^2)(R) + c8(T)(R^2) + c9(T^2)(R^2) \quad (12)$$

Where:
T=Temp in degrees F.
H=Percent Relative Humidity (XX %)
$c1 = -42.379$
$c2 = 2.04901523$
$c3 = 10.14333127$
$c4 = -0.22475541$
$c5 = -0.00683783$
$c6 = -0.05481717$
$c7 = 0.00122874$
$c8 = 0.00085282$
$c9 = -0.00000199$ The following formula (13) for calculating the Heat Index is good for temperatures ranging from 70° F. to 115° F. and RH from 0 to 80% with HI<150. Formula (13) is the same as Formula (12) but incorporates a different set of constants:

$$HI = c1 + c2(T) + c3(R) + c4(T)(R) + c5(T^2) + c6(R^2) + c7(T^2)(R) + c8(T)(R^2) + c9(T^2)(R^2) \quad (13)$$

Where:
T=Temp in degrees F.
H=Percent Relative Humidity (XX %)
$c1 = 0.363445176$
$c2 = 0.988622465$
$c3 = 4.777114035$
$c4 = -0.114037667$
$c5 = -0.000850208$
$c6 = -0.020716198$
$c7 = 0.000687678$
$c8 = 0.000274954$
$c9 = 0$ The following illustrates a set of rules in one embodiment of the invention for the Comfort Window (CW). Here, the abbreviations "Max" refer to maximum, "Min" refer to minimum and "RH" refers to relative humidity.
Min CW Temp Range=2° C. or 4° F.
Min CW RH Range=20%
Max Temp Setpoint=99°
Min Temp Setpoint=40°
MaxRH Setpoint=The max limit is set 60%
MinRH Setpoint=The min limit is set 20%
DeltaE=Minimum enthalpy difference before the economizer runs=1.

However, it is contemplated within the scope of the invention that any values may be set for the CW Ranges and minimum and maximum Temperature and RH setpoints.

The foregoing illustrate one set of rules in one embodiment of the invention, it is contemplated within the scope of the invention that any other set of rules and conditions may be used.

The following illustrates one embodiment for calculating and visually depicting sloping lines 1105 and 1107 shown in FIG. 3A, wherein the following method is performed for each of the CW HighSetPoint Temp 6110 and the CW LowSetPoint Temp 6120. Steps 1a-5a are described in terms of CW HighSetPoint Temp 6110, however these steps will need to be repeated for the CW LowSetpoint Temp 6120 subsequently.

1a) Take the Dry Bulb CW HighSetPoint temperature 6110 that is set on the Comfort Window Setup Page, shown in FIG. 7.

2a) At both the MaxRH CW setpoint 6130 and MinRH CW setpoint 6140, determine the FeelsLike Temperatures.

3a) Calculate the difference between the 2 Feels-Like Temperatures derived from the information gathered in 1a and 2a. The first Feels-Like temperature is derived from the combination of the CW HighSetPoint temperature 6110 and the MaxRH CW setpoint 6130. The second Feels-Like temperature is in turn derived from the combination of the CW HighSetPoint temperature 6110 and the MinRH CW setpoint 6140. Then, take the difference between the two Feels-Like Temperatures to find the Feels-Like Temperature Range that is spanned for the CW HighSetPoint temperature 6110 at these two RH extremes.

4a) Apply the temperature range calculated in 3a to the CW HighSetPoint temperature 6110 on the drybulb temperature/relative humidity graph (which is the Comfort Window graph in FIG. 3A or FIG. 3B). To do this, add one-half of the difference calculated in 3a to the CW HighSetPoint temperature 6110 to determine the high endpoint of the CW line, which is the coordinate point where lines 1105 and 1109a join in CW 1100, as shown in FIG. 3A. Then, subtract one-half of the difference from the CW HighSetPoint temperature 6110 to determine the low endpoint of the CW line, which is the coordinate point where lines 1105 and 1109b join in CW 1100.

5a) Linearly interpolate and plot this in terms of Dry Bulb Temperatures on the CW graph as a diagonal line.

We repeat steps 1a)-5a) for the CW LowSetpoint Temp 6120, the exception being that when performing step 4a) for the CW LowSetpoint Temp 6120, the high end point of the CW line will be the coordinate point where lines 1107 and 1109a join in CW 1100, and the low end point of the CW line will be the coordinate point where lines 1107 and 1109b join in CW 1100, as shown in FIG. 3A. After performing the steps 1a)-5a) for each temperature setpoint, the final lines will be centered on the CW Setpoint Temperature, either High 6110 or Low 6120, depending on which one is being created.

The following illustrate one embodiment for calculating and visually depicting sloping lines 1105 and 1107 shown in FIG. 3A, wherein the following method is performed for each of the CW HighSetpoint Temp 6110 and the CW LowSetpoint Temp 6120:

1b) Take the Dry Bulb CW SetPoint temperature (either High or Low) that is set on the Comfort Window Setup Page, shown in FIG. 7.

2b) At a number of points within the range (between MaxRH CW setpoint 6130 and MinRH CW setpoint 6140), determine the Feels-Like Temperatures.

3b) Calculate the difference between each adjacent Feels-Like Temperature point given the corresponding two relative humidities. Then, use each of these points to find the Feels-Like Temperature Range that is spanned for this given SetPoint Temperature at each RH sub-range.

4b) For each sub-range, add one-half of each difference to each dry bulb temperature, starting at the CW SetPoint temperature and moving away from it, for the high end of the CW line, which is the coordinate point where lines 1105 and 1109a join in CW 1100 for the high temperature setpoint, or the coordinate point where lines 1107 and 1109a join in CW 1100 for the low temperature set point, as shown in FIG. 3A. Then, add one-half of each difference to each dry bulb temperature, starting at the CW SetPoint temperature and moving away from it, for the low end of the CW line, which is the coordinate point where lines 1105 and 1109b join in CW 1100 for the high temperature setpoint, or the coordinate point where lines 1107 and 1109b join in CW 1100 for the low temperature set point, as shown in FIG. 3A.

5b) Perform a linear regression analysis using these multiple points to interpolate and plot this in terms of dry bulb temperatures on the CW graph as a straight diagonal line. After performing the steps 1b-5b, the final line will be centered on the CW Setpoint Temperature, either High or Low, depending on which one is being created.

In another embodiment for calculating and visually depicting sloping lines 1105 and 1107 and lines shown in FIG. 3A, we perform the same steps as in steps 1b)-5b), except we do not perform the linear regression analysis and leave the line as a non-linear line on the top and bottom of the comfort window, performing a linear interpolation between each point.

Figure 14:
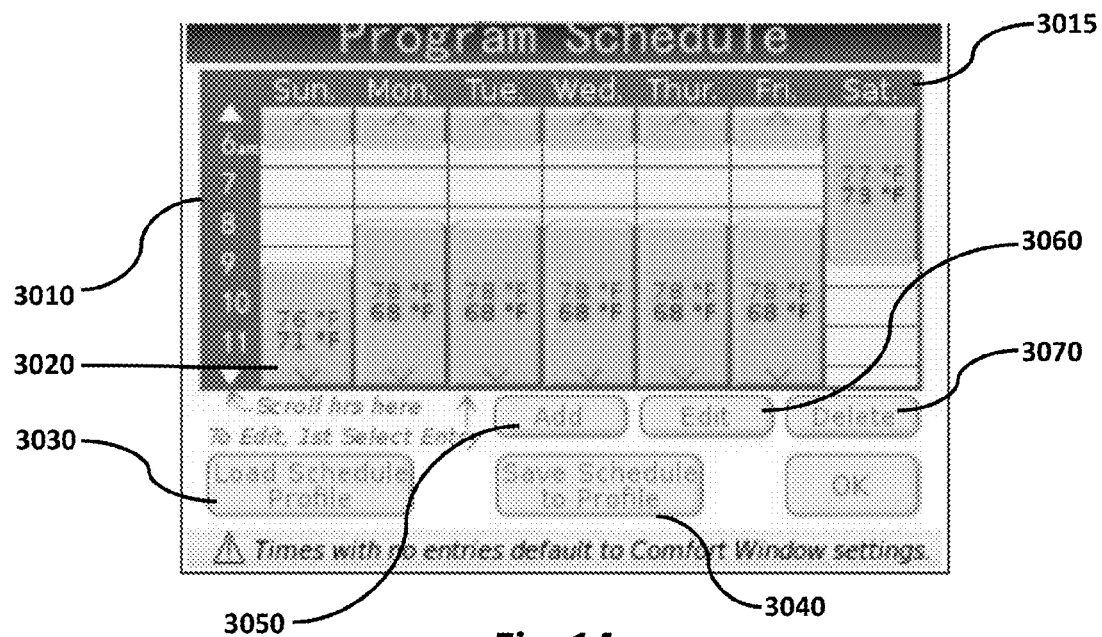
FIG. 14 provides an illustrative but non-limiting example of the programming schedule display.

Referring now to FIG. 3B, which illustrates one embodiment of a comfort window display and override feature, which may be used as either a home screen or alternative that can be accessed via the Comfort Window Icon in the top right of the Home Screen or in another embodiment via the Home Icon on the lower left of the Home Screen. Here, temperature 3101B indicates the outdoor temperature and temperature 3103B indicates the indoor temperature. In this embodiment, an override feature is provided that allows the user to alternatively override previously set parameters for Comfort Window temperature and humidity as shown in FIG. 7, or to override previously set program entry settings if there are any scheduled to run, as shown in FIG. 14. In this embodiment, each differential temperature offset 3121B is shown with respect to the CW settings, as shown in FIG. 7. In particular, the user can override previously set temperature settings by pressing button 3121B and subsequently adjusting the temperature differential upwards, via the up arrow, or downwards, via the down arrow. In this embodiment, as a result of each differential temperature offset 3121B being always relative to the CW settings as shown in FIG. 7, when an override is applied while a scheduled program entry is currently active, the override window first starts out with the differential temperature that is the difference between the program schedule entry and the CW setting. The override differential temperature can be adjusted by continuing to press the up or down arrows. The resulting override temperature thus overrides the program schedule entry using the differential temperature derived from the combination of the default starting position due to the current offset from the CW settings shown in FIG. 7 as specified in the program schedule entry and the changes as made manually by the user while setting the override. When the override time expires, the differential temperature returns to the difference between the CW settings and the settings as specified by the current active program entry. This is important simply because it allows the current status of the controller 10 to be shown for a quick view of what is happening on the controller 10, including showing that a program entry is currently controlling the high and low setpoints for the controller 10.

Figure 3C:
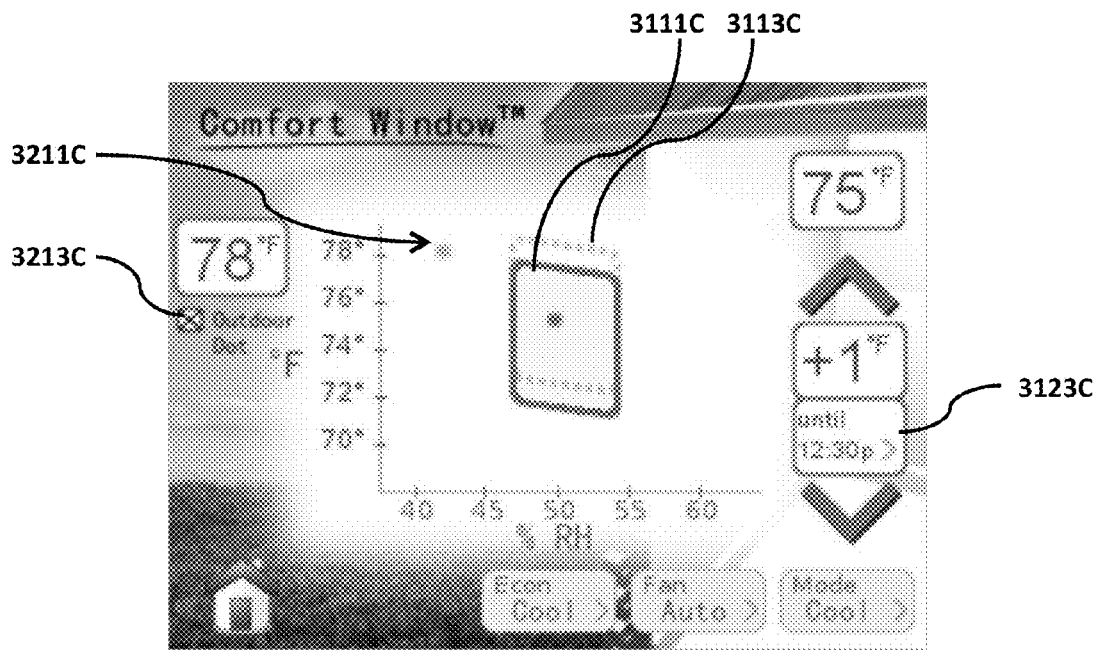

Further, the user can set the duration for how long the override should take effect, namely, by pressing button 3123B and setting the time for how long the override should last, as shown by 3123C in FIG. 3C. In other embodiments, the user may further set the override time 3123B or 3123C in terms of a range of times, days, weeks, and/or months. In the current embodiment, as the override temperature differential is being set, a slightly faded or semi-transparent version 3113B of Comfort Window 3111B is simultaneously moved upwards or downwards (depending on whether the temperature is increased or decreased, respectively) along the y-temperature axis. The semi-transparent CW 3113B can be shown on the display congruently with window 3111B during the time that the temperature or humidity override is taking place. Further, the user may have the option of having window 3113B be displayed at all times when any temperature and/or humidity settings such as program schedule entries or vacation settings are overriding global CW settings, as set forth in FIG. 7. In addition, FIG. 3E and FIG. 3F illustrate additional embodiments for how to override feature can be shown.

Referring to FIG. 3C, in another embodiment, the user is provided with the option to have the outdoor temperature and humidity shown via node 3211C on the user interface display or home screen. Further, the temperature and/or humidity axes may be dynamically adjusted to compensate for higher outdoor temperature to be shown on the same display congruently with CW 3111C and/or 3113C. The user can be provided the option to toggle the outdoor node feature on/off via a check box component 3213C. In other embodiments, other methods to toggle the outdoor temperature may be shown, such as via drop down menu or other related graphical interface methods, voice activation, or wirelessly, or similar methods which may be obvious to one of ordinary skill in the art. In still other embodiments, any number of remote temperatures may be displayed via similar nodes on the same CW display, including but not limited to any number of other zones' temperature/humidity nodes, temperatures/humidities for other locations or cities, or other temperatures/humidities of other physical items, such as oven temperatures, or even human body temperatures as measured by other sensing mechanisms and transmitted either with wires or wirelessly, either through the internet, across a LAN, or by any other means to the controller 10.

Figure 3D:
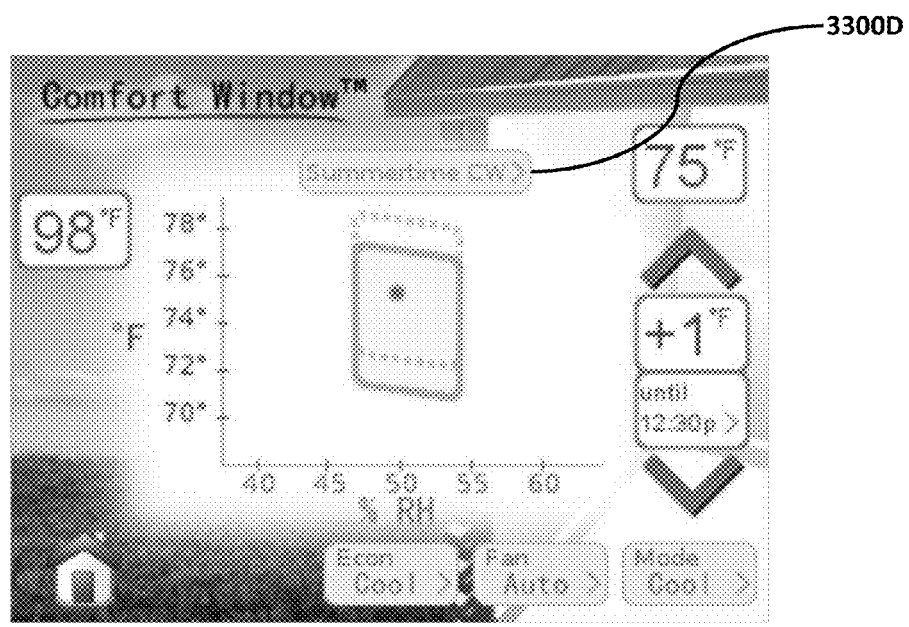
Figure 3E:
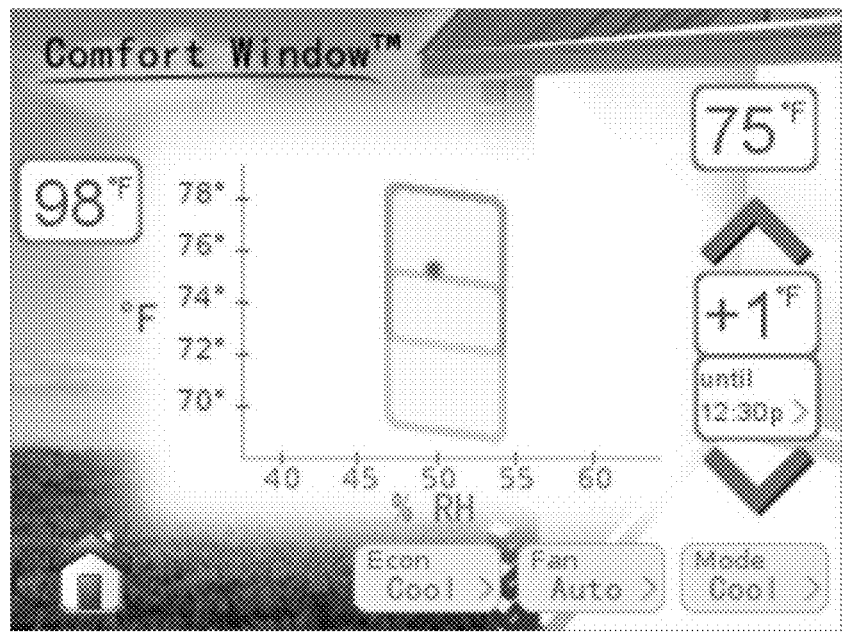
Figure 3F:
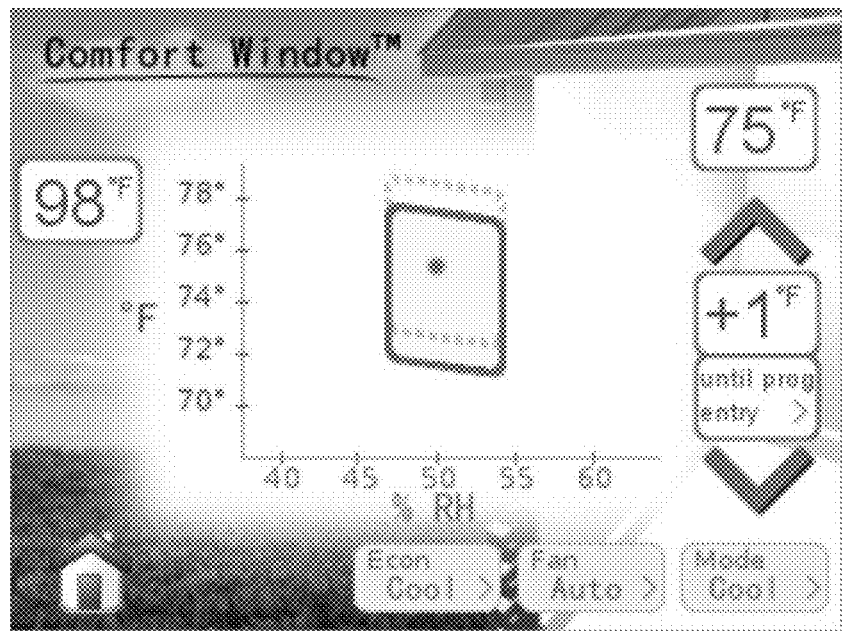
Figure 3G:
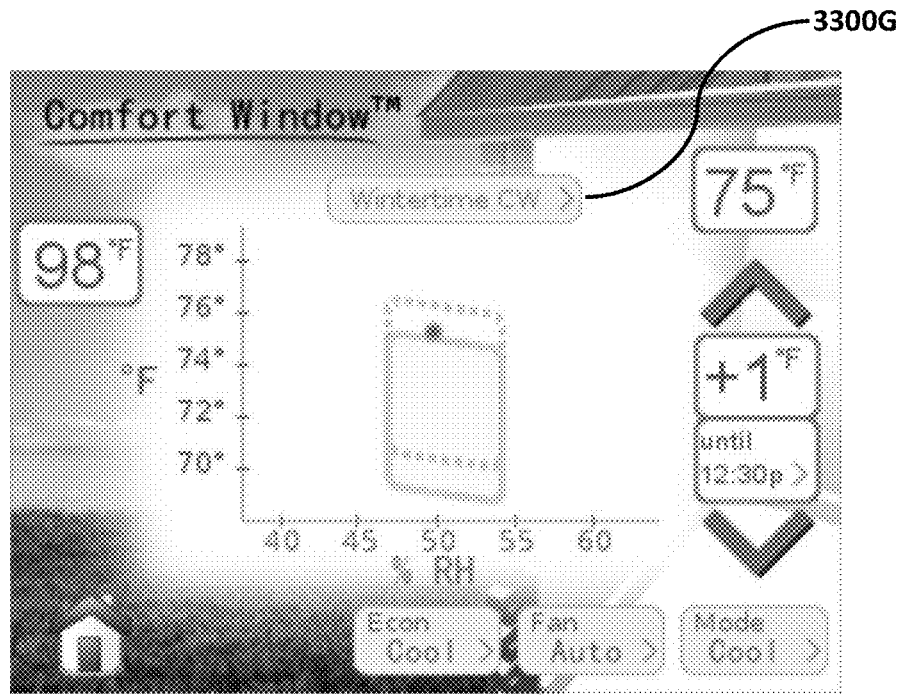
Figure 3H:
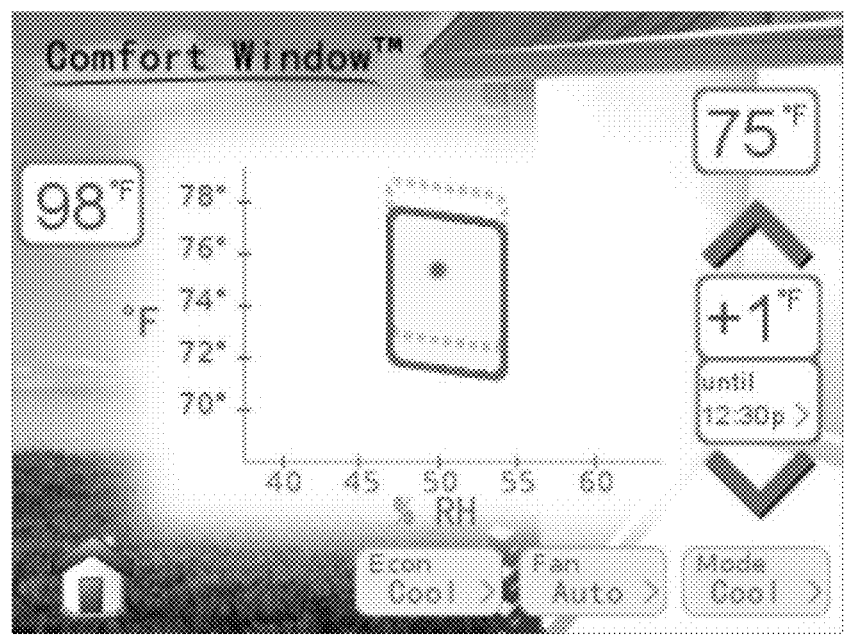

Referring now to FIGS. 3D and 3G, which illustrates other embodiments, the user may be provided the option to select pre-set seasonal settings for the Comfort Window, such as summertime settings 3300D and wintertime settings 3300G. It is contemplated that all four seasons (summer, fall, winter, and spring), or any specific, months, days, or holidays may additionally be provided to the user.

Figure 4:
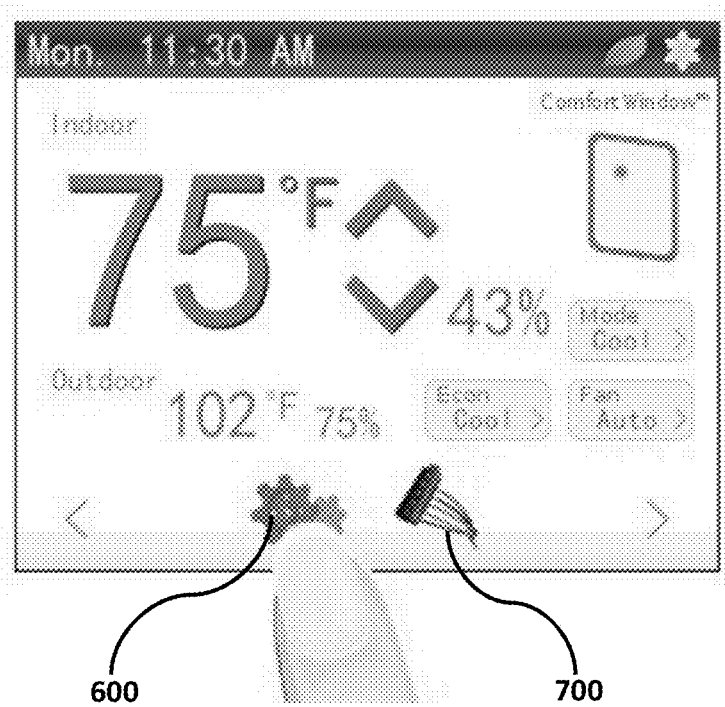
FIG. 4 provides an illustrative but non-limiting example of the home screen with the settings menu icon.
Figure 5A:
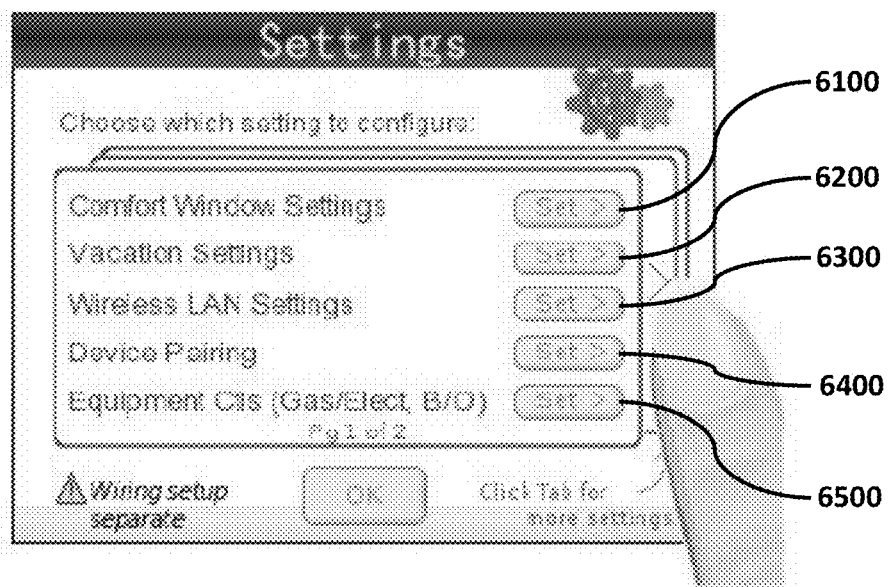
FIG. 5A provides an illustrative but non-limiting example of the settings menu display.

Referring now to FIG. 4, a display is shown that allows the user to set certain settings for the controller. For example, by touching or pressing icon 600, the controller will take the user to a settings page, as shown in FIG. 5A. In addition, icon 700 will take the user to a wiring diagram set up page (not shown). Once the user is at the settings page, as shown in FIG. 5A, he or she is provided with multiple options, such as changing the Comfort Window settings 6100, vacation settings 6200, wireless LAN settings 6300, device pairing settings 6400, and/or equipment configurations 6500. In addition, by pressing the right arrow icon on the right hand side of the screen, the user can be taken to additional pages or tabs for additional setting options. It is contemplated within the scope of the invention that any type of setting features may be provided. Further, the method of how the settings are provided on the interface may also include drop-down menus, tabular, pop-up, or other types of menu and/or option selection methodologies or icons that would be obvious to one of ordinary skill in the art.

Figure 5B:
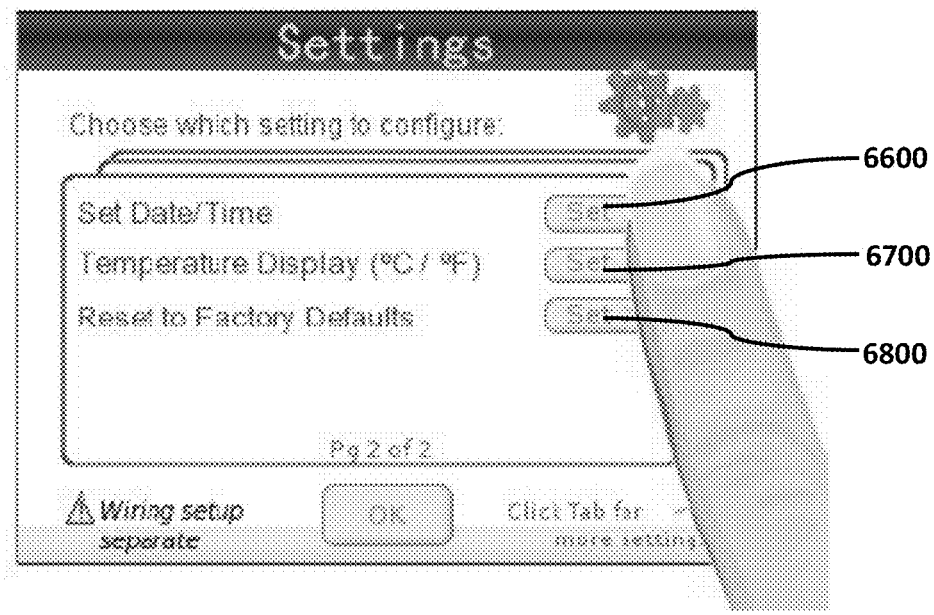
FIG. 5B provides an illustrative but non-limiting example of alternative menu for the settings menu display.
Figure 6:
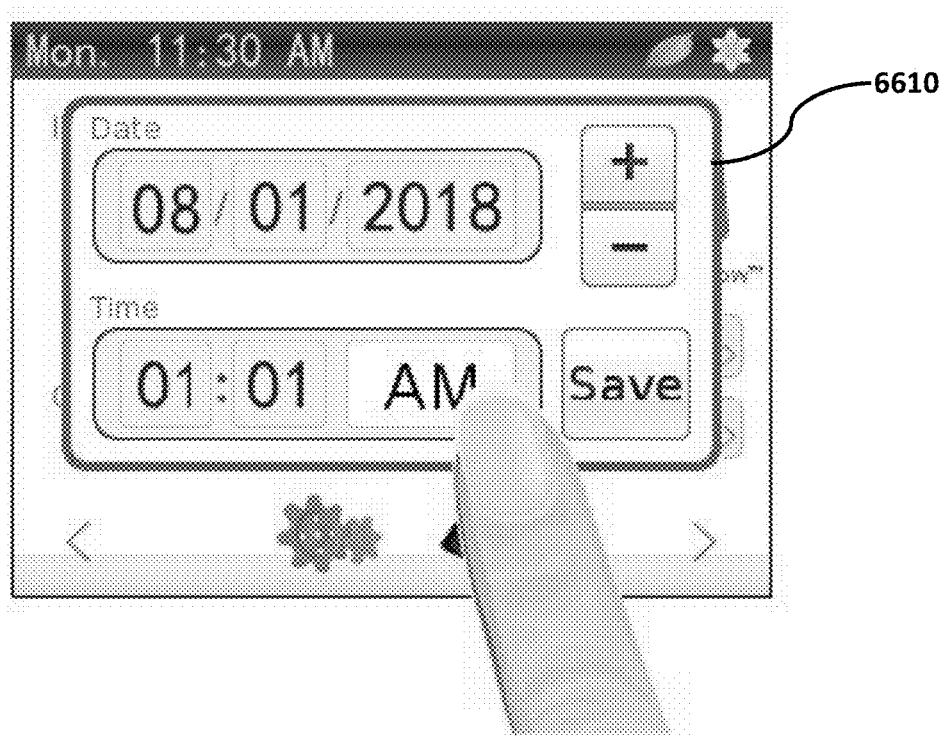
FIG. 6 provides an illustrative but non-limiting example of a menu for setting current date/time.

Referring now to FIG. 5B, this settings screen allows the user to set the date/time via component 6600, temperature display 6700, and/or reset factory defaults 6800. By pressing icon 6600, the user is taken to screen 6610, as shown in FIG. 6, which allows the user to set the date and time by manually entering such. Still referring to FIG. 5B, by pressing icon 6700, the user is taken to the Comfort Window settings menu, as shown in FIG. 7. By pressing icon 6800, controller 10 resets to all factory default settings, such as date, time, temperature, and humidity settings, among others.

Figure 8:
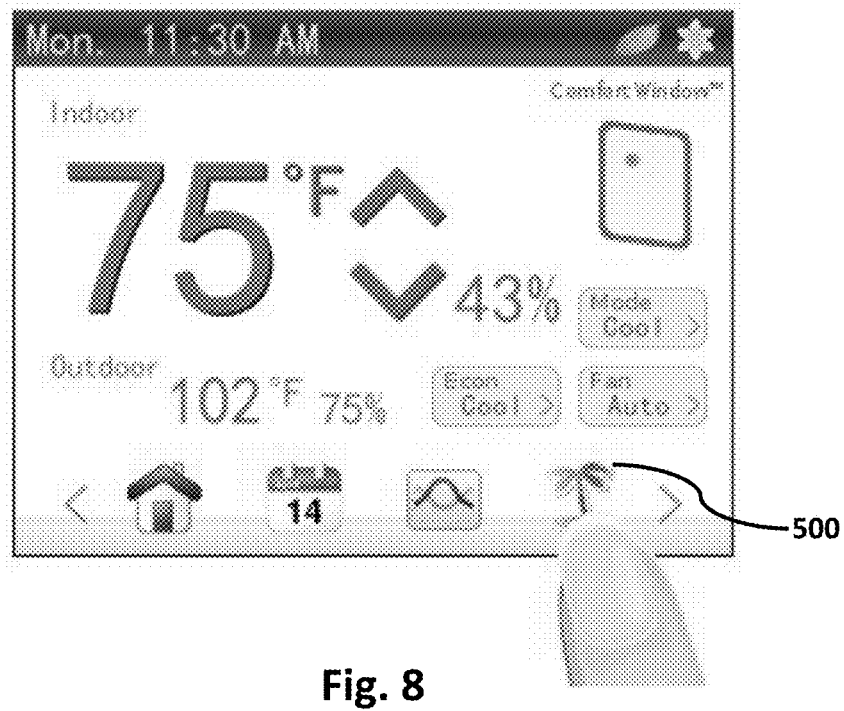
FIG. 8 provides an illustrative but non-limiting example of the home screen with a vacation mode icon.
Figure 9:
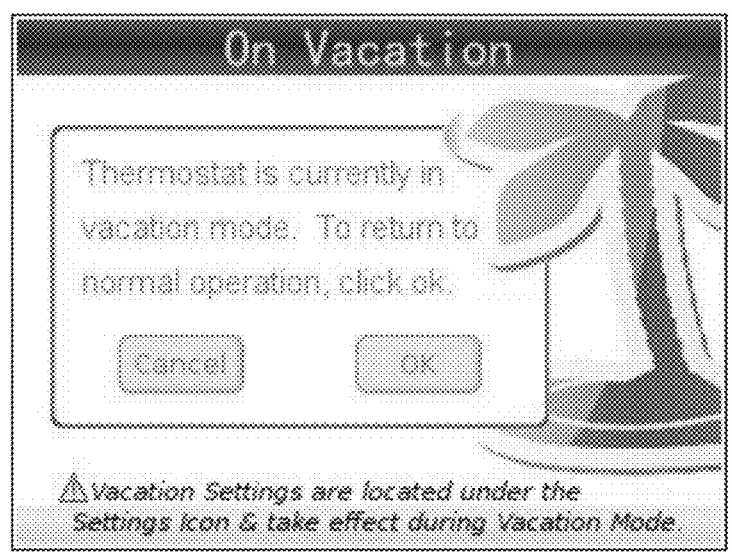
FIG. 9 provides an illustrative but non-limiting example of the vacation mode display.

FIG. 8 illustrates one embodiment for displaying the home screen with a vacation icon 500. Vacation icon 500 takes the user to a screen, illustrated in FIG. 9, that automatically and immediately sets the controller's high and low global temperature settings to previously defined vacation mode temperature settings.

Figure 10:
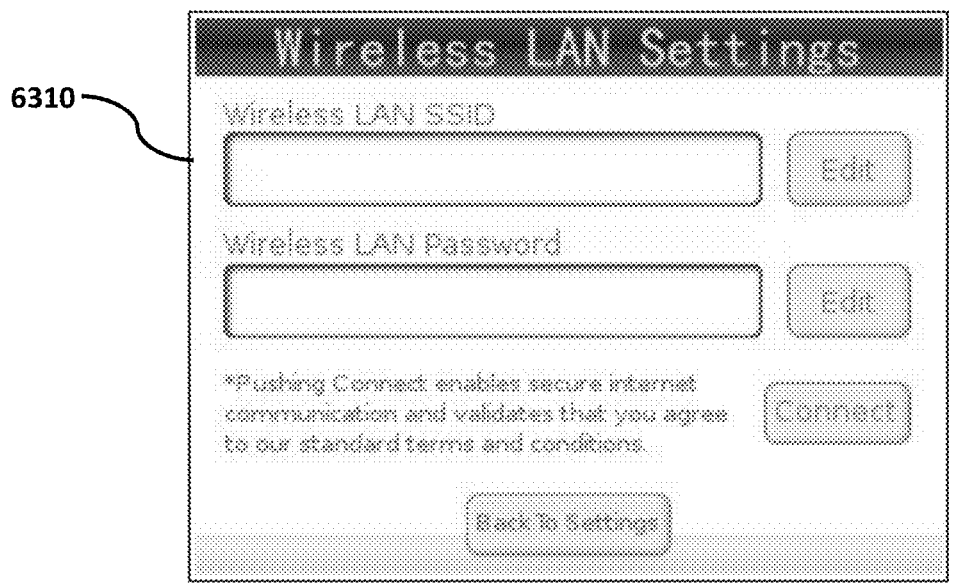
FIG. 10 provides an illustrative but non-limiting example of the wireless settings display.
Figure 11:
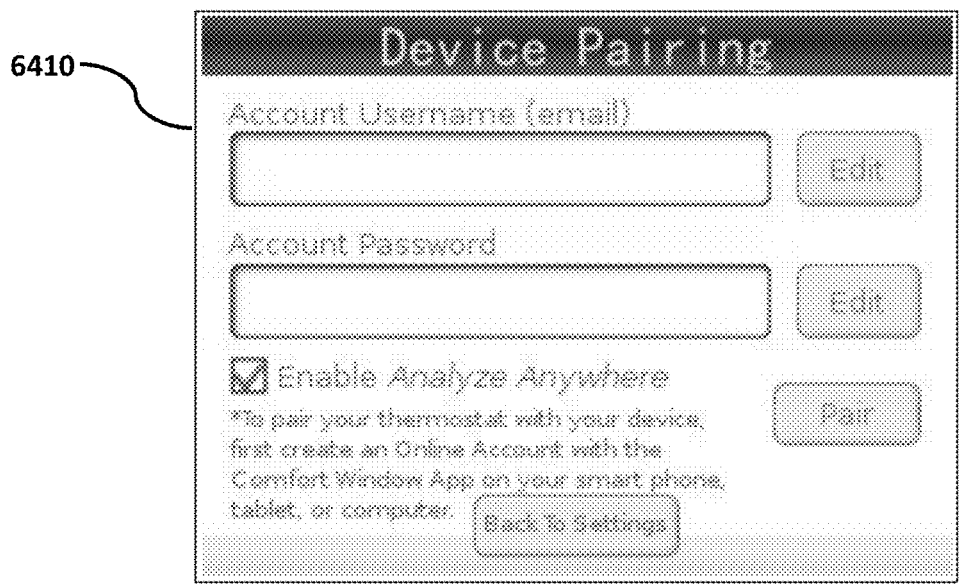
FIG. 11 provides an illustrative but non-limiting example of the wireless computing device pairing and account information.

FIG. 10 illustrates one embodiment of providing the user the option of entering wireless network settings. Controller 10 provides connectivity via a compatible WiFi or 802.11b/g/n LAN network or through any other wireless or wired PAN or HAN network such as Zigbee, Z-wave, Homeplug, etc. potentially through a router and through the internet, and eventually connecting to a computer device such as a desktop computer, laptop computer, mobile phone, smartphone, tablet computer, iPhone®, iPad®, Blackberry®, Android® enabled devices, or any computing device that may become available in the future. In one embodiment, a server computer located on the internet can act as an intermediary between the controller 10 and any one or more end devices. This allows for a simpler and more secure transfer of control packets and data packets to and from the controller 10. It also allows universal access to information such as historical temperature data at all times to any internet-connected device. Finally, it also acts as a means and method for additional features to be employed, such as estimated outdoor temperatures as gathered from the internet and deployed to each individual controller 10, based on IP address location data of the controller 10 or based on other location information either explicitly described by the user or implicitly determined by the controller 10 or server system. It is contemplated within the scope of the invention that any of the aforementioned computing devices can include proprietary software and/or applications for communicating with controller 10. Still referring to FIG. 10, the wireless network SSID and password can be entered at this screen. Controller 10 supports various wireless protocols, including but not limited to, WEP-128, WPA-PSK (TKIP), and WPA2-PSK (AES). In the current embodiment, controller 10 also adds an extra layer of security by using a secure private encryption key. In other embodiments, it is contemplated that the use of other security measures could be used that might take advantage of such security schemes as public keys or negotiated key systems. Further, controller 10 automatically determines which encryption method a wireless access point is using and automatically encrypts communication using the appropriate protocol. FIG. 11 illustrates one embodiment of providing the user the ability to enter username and password data that enables a one-to-one relationship between a user account on the aforementioned server and any given controller 10. In this way, it is possible to pair a particular controller 10 with a particular end device by matching the account username and password on both the controller 10 and the end device. It is also possible to connect multiple end devices to the same account in this manner so that multiple end devices (such as multiple smart phones) can control temperature settings for the same controller 10. Further, the user can access data stored on the controller using the same user account. In addition, various types of access privileges can be assigned to each account, such as administrator, technician, employee, parent, child, or third party user. In other embodiments, controller 10 can also provide Bluetooth® pairing with any Bluetooth® enabled device.

Figure 13:
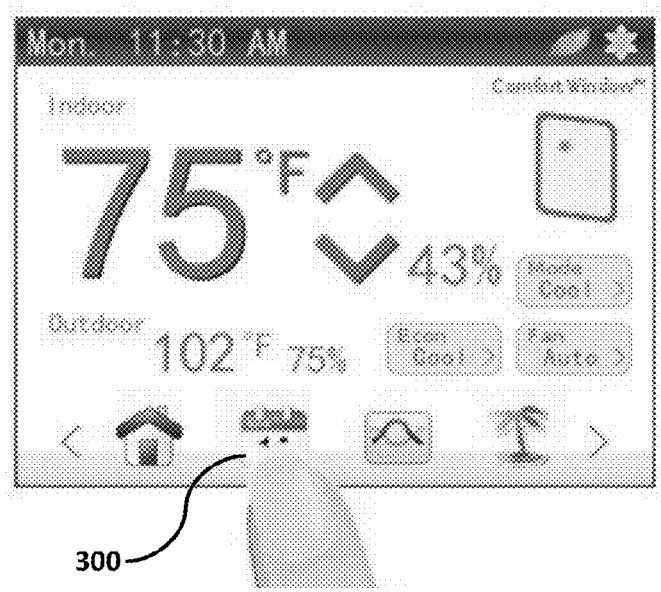
FIG. 13 provides an illustrative but non-limiting example of the home screen with a programming schedule icon.

Referring now to FIG. 13, the user can access the program schedule of the controller from the home screen by pressing calendar icon 300. Once icon 300 is pressed, the user is then subsequently taken to the program schedule interface, as shown in FIG. 14. FIG. 14 illustrates one embodiment for displaying the program schedule for a given week. Here, area 3015 is indicative of a given day within a week and area 3010 is indicative of a time range in each given day. In addition, one or more of blocks 3020 indicate the actual programmed high and low temperature set-points for the given time range and day. Unlike traditional programmable thermostats that require the user to program in every temperature set-point for every section of time for each day of the week, the program schedule of controller 10 allows the system to revert back to pre-set Comfort Window settings (FIG. 7) when a program setting expires and there are no other program settings scheduled to start afterwards. Here, the user can input as many or as few program settings as he or she desires for the time periods when he or she will be away from the home or dwelling. Additionally, each entry can be associated with multiple days of the week, further reducing the complexity involved in setting up the program schedule. For example, instead of entering a separate entry for each 8-5 shift on each day of a work week, the user can enter a single entry for this repeating activity. Furthermore, again unlike traditional programmable thermostats, each program entry can be associated with multiple non-consecutive days of the week. Alternatively, the user can independently set each entry for each day or time range in a given week.

Figure 16:
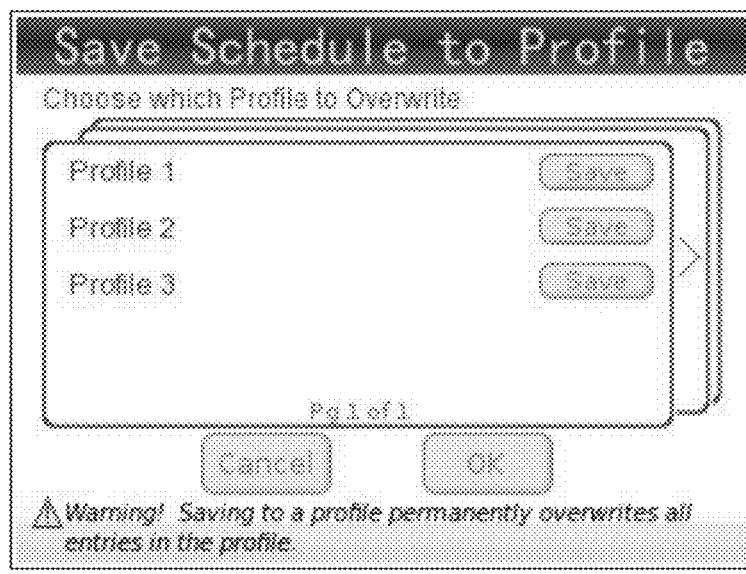
FIG. 16 provides an illustrative but non-limiting example of the save programming schedule profiles display.
Figure 17:
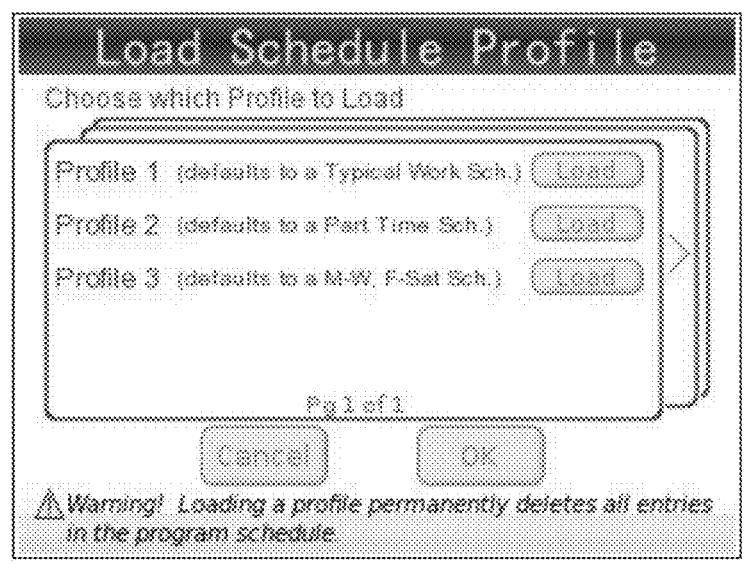
FIG. 17 provides an illustrative but non-limiting example of the load programming schedule profiles display.

Still referring to FIG. 14, the user can add a new program schedule entry by pressing the add icon 3050, edit one of the current program schedule entries by first selecting a given program schedule entry by pressing (and thus highlighting) a given program schedule entry, and then pressing the edit icon 3060. The user can also delete one of the current program schedule entries by again first selecting a given program schedule entry by pressing (and highlighting) a given program schedule entry and then pressing delete icon 3070. In addition, the user can save the current schedule to a user profile by pressing icon 3040, which will take the user to the screen shown in FIG. 16, which allows the user to save the current profile. It is contemplated within the scope of the invention that any number of custom profiles can be created and saved on the controller. Still referring to FIG. 14, the user can load prior saved profiles by pressing icon 3030, which will take the user to the screen shown in FIG. 17. It is further contemplated within the scope of the invention that the user can upload or download previously created profiles via a computing device.

Figure 15A:
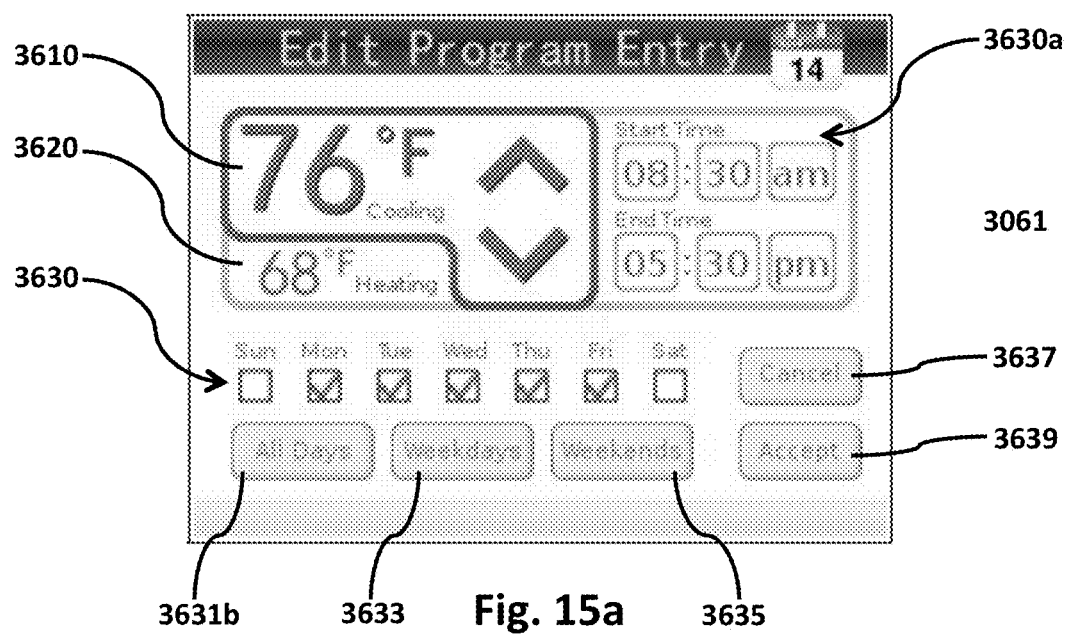
FIG. 15a provides an illustrative but non-limiting example of the programming schedule editing display.
Figure 15B:
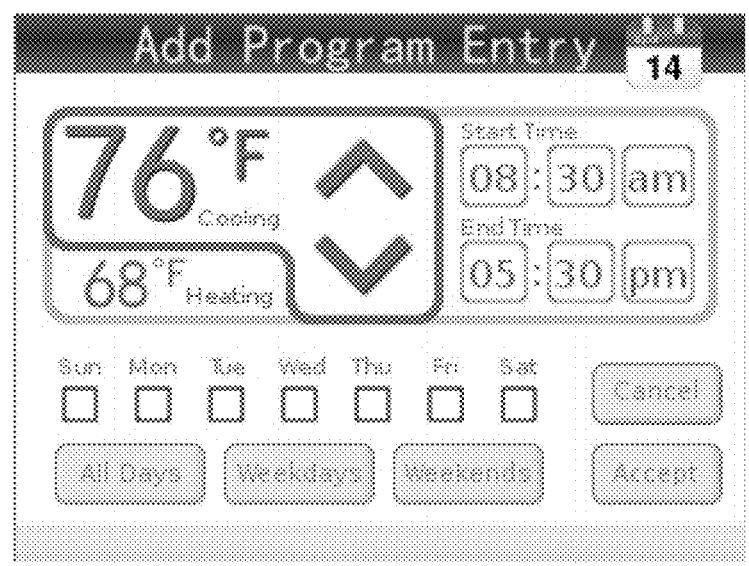
FIG. 15b provides an illustrative but non-limiting example of the programming schedule add display.

Once the user presses the add icon 3050 or the edit icon 3060, he or she is taken to the screen shown in FIG. 15*a*, which illustrates one embodiment for how the user can edit program scheduling. Here, the user can set the high and low temperature set points for a given time range for each given day. Module 3610 indicates the high temperature set point for auto or cooling mode and is disregarded in heating mode, and module 3620 indicates the low temperature set point for auto or heating mode and is disregarded in cooling mode. Area 3630*a* allows the user to manually set the time range, and area 3630 allows the user to assign the time ranges to each day of the week via checkboxes. In addition, controller 10 provides an option for the user to add to the ease of the interface by automatically assigning one or more of the current temperature set points and time range to either all days of the week by pressing the "All Days" icon 3631*b*, or only weekdays by pressing the "Weekdays" icon 3633, or only the weekends by pressing the "Weekends" icon 3635. Once the user is satisfied with his or her selection for the programming schedule, he or she can press "Accept" icon 3639 which will save the program settings and take the user back to the screen illustrated in FIG. 14. If the user does not desire to save the current settings, he or she may cancel the operation and go back to the program settings screen illustrated in FIG. 14 by pressing "Cancel" icon 3637. Referring back to FIG. 14, for the time ranges where no schedule entry is programmed, the controller reverts to the default global comfort window temperature and humidity set points, as previously described via FIG. 7. Further, upon expiration of program schedule for a given time and day, the controller will revert to the default global Comfort Window temperature set points. In addition, in the current embodiment, if the user decides to use the override functionality, as described via FIGS. 3B-3H, then the controller can override the program schedule settings for the period of time set in the override mode and revert back to the program schedule settings upon expiration of the override mode. Similarly, if the user presses the add icon 3050, he or she is taken to an add program entry screen depicted in FIG. 15*b*. Here, the functions of the add program entry screen FIG. 15*b* function the same as that of the edit program screen depicted in FIG. 15*a*, including a module for setting the high temperature set point for auto or cooling mode, module for setting the low temperature set point for auto or heating mode, time setting capability, and time range setting capability for weekdays, weekends, and/or all days of the week.

An energy saving feature for the controller will now be described. Here, the controller of the present invention uses an innovative energy saving method and algorithm, referred to herein as the "Economizer", to bring outdoor air indoors in order to heat or cool a home whenever it is possible and advantageous to do so. Traditional thermostats will run the compressor to try to bring the indoor temperature in line with predefined settings, thereby using valuable energy that does not need to be used. However, the Economizer of the controller in the present invention will save valuable energy resources by simply bringing outdoor air inside. Here, the controller not only automates this process, but it also evaluates the outdoor air before bringing it indoors. It is important to measure the humidity of the outdoor air to make sure that only air that doesn't contain too much humidity is allowed indoors. This is important because it is potentially dangerous to allow too much moisture into a home. For example, if the user manually opens windows, he or she never really knows how much humidity could be entering the home. This could possibly lead to indoor air quality issues, letting uncomfortable air inside, and/or problems with mold or mildew growth. In one embodiment, controller 10 measures the outdoor humidity and computes the enthalpy to be sure that only outdoor air with the appropriate enthalpy is let into the building and that only the appropriate volume of air needed to satisfy the conditions of the Economizer algorithm, as will be described in further detail, is actually let into the building. Controller 10 dynamically calculates and determines when to bring the outdoor air inside, thus significantly reducing compressor or furnace run-time. Controller 10 brings a home's temperature and humidity point deep into the Comfort Window before shutting off the outdoor air feature.

Figure 18:
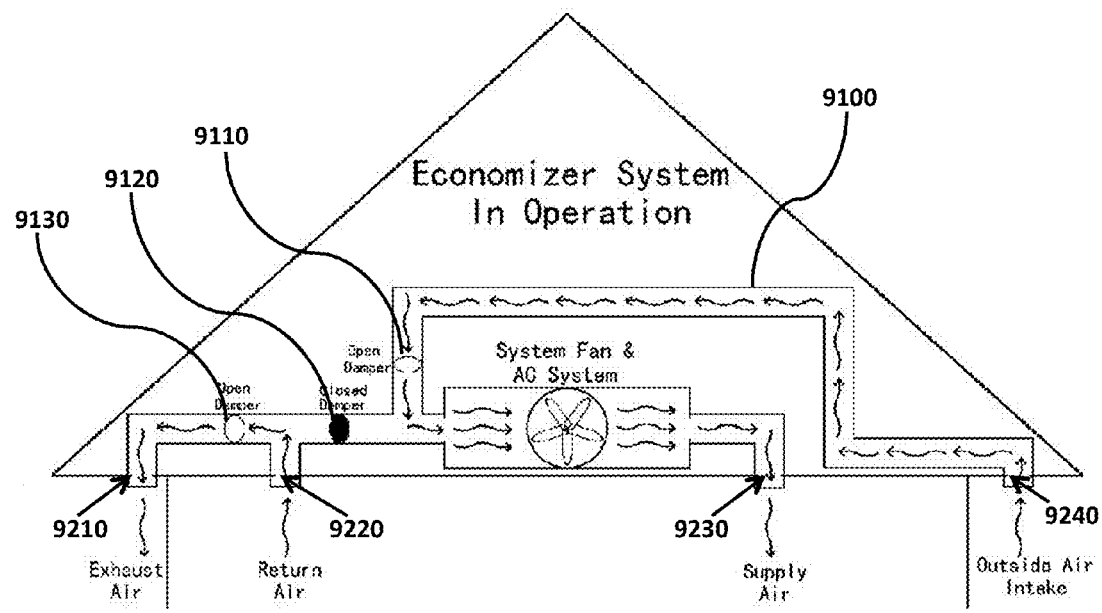
FIG. 18 provides an illustrative but non-limiting example of the economizer mode feature in "airflow active" operation.
Figure 19:
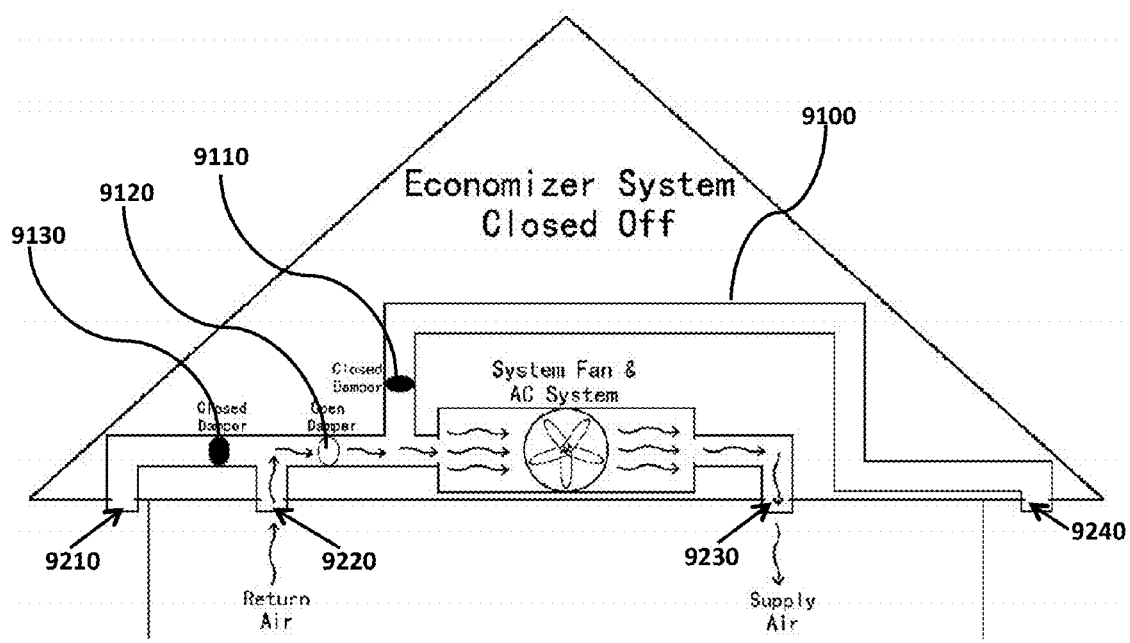
FIG. 19 provides an illustrative but non-limiting example of the economizer mode feature in "airflow inactive" operation.

The aforementioned Economizer is illustrated in one embodiment shown in FIG. 18 and FIG. 19, which illustrate a duct and fan system in an attic of a house. FIG. 18 illustrates the system wherein the controller or the Economizer feature of the controller is actuating the correct dampers in such a way that outdoor air is circulating through the ducts into the supply of the house, hereto referred to as the "airflow active" position. Note that this is not to be confused with the Economizer "On" Mode because during the time that the Economizer's Mode is set to "On", it is possible for the Economizer to set the dampers on and off between the "airflow active" position, shown in FIG. 18, and the "airflow inactive" position, shown in FIG. 19, a number of times, depending on the relative temperature changes of the indoor temperatures and outdoor temperatures. In this way the Economizer Mode is a setting that may not change, but the "airflow active" or "airflow inactive" state is automatically maintained by the Economizer when the Economizer is in "On" mode. FIG. 19 illustrates the system wherein the Economizer mode is in the "airflow inactive" position. Referring now to FIG. 18, during the "airflow active" position, controller 10 signals various electrically controlled dampers within the air duct to open for a given time period. Further, controller 10 can potentially control the degree to which a damper is closed or opened, depending on the particular damper style used. Here, in the "airflow active" position, damper 9110 opens to allow intake of outside air to enter duct 9100 via inlet 9240. One or more auxiliary fans (such as an integrated duct fan) or regular system fans (located in the air handler of most HVAC systems) drive the outside air to the inside of the home via outlet 9230. Further, during the "airflow active" mode, damper 9120 is closed off to separate the outside intake air flow from the inside return air. Here, inside return air enters the duct system via inlet 9220 and passes through opened damper 9130 and exits to the outside atmosphere via outlet 9210.

Referring now to FIG. 19, the "airflow inactive" mode for the Economizer is shown. Here, controller 10 signals dampers 9110 and 9130 to be closed off to prevent outside atmospheric air from entering into the system and preventing inside air from leaving the system. Further, controller 10 opens damper 9120 to allow the inside return air to recirculate through the system by entering via inlet 9220 and exiting as supply air via outlet 9230 to the inside of the home. In this embodiment, the operation of the dampers (in either the "airflow active" or "airflow inactive" Economizer modes) can occur simultaneously. However, it is contemplated within the scope of the invention that the open and close sequence of each of the aforementioned dampers can occur sequentially with a switching mechanism in order to save controller 10 resources at any time. In addition, FIG. 18 and FIG. 19 are illustrative of one embodiment of how the Economizer of the invention can operate. It is contemplated within the scope of the invention that any number configurations for the duct system, dampers, fans, and or compressors can be incorporated and may become apparent to one of ordinary skill in the art.

The following illustrates certain conditions for operating the Economizer features in one embodiment of the controller:

For the Economizer in Cooling Mode:
  Outdoor Enthalpy+DeltaE<Indoor Enthalpy
  Outdoor Temp<=Indoor Temp (Actual values, not Feels-Like)
  Indoor RH<MaxRH CW setpoint 6130
    OR Outdoor RH<MaxRH CW Setpoint 6130
  Indoor RH>MinRH CW setpoint 6140OR Outdoor RH>MinRH CW Setpoint 6140
  Outdoor RH<90%
  Indoor FeelsLikeTemp>CW LowSetPoint Temp 6120
For the Economizer in Heating Mode:
  Indoor Enthalpy+DeltaE<Outdoor Enthalpy
  Outdoor Temp=>Indoor Temp
  Indoor RH<MaxRH CW setpoint 6130
    OR Outdoor RH<MaxRH CW Setpoint 6130
  Indoor RH>MinRH CW setpoint 6140OR Outdoor RH>MinRH CW Setpoint 6140
  Outdoor RH<90%
  Indoor FeelsLikeTemp<CW HighSetPoint Temp 6110
For the Economizer in Auto Mode:

If the heater and/or compressor controls (referred to herein as "Mechanical System") is currently set to "Off", the controller determines whether to "Free Heat" or "Free Cool" in the Economizer Auto Mode depending on the last reached (CW HighSetPoint 6110 or CW LowSetPoint 6120) temperature. If the Mechanical System is currently set to "Auto", the Economizer will either start to Free Heat or Free Cool while in Economizer Auto Mode depending on the last Mode that the Mechanical System ran (Heat or Cool).

(a) Economizer Auto Mode Cooling:
  Outdoor Enthalpy+DeltaE<Indoor Enthalpy
  Outdoor Temp<=Indoor Temp (Actual values not Feels-Like)
  Indoor RH<MaxRH CW setpoint 6130
    OR Outdoor RH<MaxRH CW Setpoint 6130
  Indoor RH>MinRH CW setpoint 6140OR Outdoor RH>MinRH CW Setpoint 6140
  Outdoor RH<90%
  Indoor FeelsLikeTemp>CW LowSetPoint T 6120+0.25*(CW HighSetPoint T 6110−CW LowSetPoint T 6120)
  (b) Economizer Auto Mode Heating:
  Indoor Enthalpy+DeltaE<Outdoor Enthalpy
  Outdoor Temp>=Indoor Temp
  Indoor RH<MaxRH CW setpoint 6130
    OR Outdoor RH<MaxRH CW Setpoint 6130
  Indoor RH>MinRH CW setpoint 6140OR Outdoor RH>MinRH CW Setpoint 6140
  Outdoor RH<90%
  Indoor FeelsLikeTemp<CW HighSetPoint T 6110−0.25*(CW HighSetPoint T 6110−CW LowSetPoint T 6120)

In addition, the Economizer Mode automatically changes when the user changes the Mechanical Mode (i.e. Heating or Cooling). For example, if the Economizer is in Heating Mode and the Mechanical Mode is also in Heating Mode, but then the user changes the Mechanical Mode to Cooling, the Economizer mode must also change since it would be working against the mechanical equipment. In other embodiments, the controller may also use weather forecasting information to help to determine when and in what mode to run the Economizer. For example, with the weather forecast information the controller will know whether to Pre-Load the prior to a Cold Front or prior to a Heat Wave.

The Economizer can have many separate modes that allow it to work in harmony with the heater and compressor systems of a home (referred to herein as "Mechanical system"). In the current embodiment, the Economizer and Mechanical system are mostly independent systems from each other and are capable of operating at the same time to accomplish the same objectives (ie: Mechanical system="Cool" and Economizer="On"). Further, both the Economizer and Mechanical system can each have additional separate modes or states of their own. In the current embodiment, the Economizer can be put into a number of states, but only depending on what mode the Mechanical system is set to. For example, if the Mechanical system is in "Off" mode, the Economizer can be placed into "Heat", "Cool", "Auto", or "Off" modes. However, if the Mechanical system is in the "Heat" mode, the Economizer Mode can only be placed into "On" or "Off" mode. In this scenario, the Economizer "On" mode refers to the controller being in "Free Heating Mode", which will be described later. Alternatively, if the Mechanical system is in "Cool" mode, then the Economizer "On" mode refers to the controller being in "Free Cooling Mode". If Mechanical Mode is in "Auto", then the Economizer Mode can be placed into "On" or "Off", wherein "On" in this scenario indicates that the Economizer is in Auto mode and can further indicate that the controller is in either Free Cooling Mode or Free Heating Mode, depending on what operation the Mechanical system last performed (i.e. either the compressor ran last or the heater ran last) wherein the Economizer follows suit so that the operations of the Economizer and Mechanical system do not conflict with each other, such as in a situation where a program entry is set to specifically take the house outside of the comfort window zone.

Further, in a scenario wherein the Mechanical system is set to "Off" and the Economizer is in "Auto" mode, the Economizer goes into Free Heating or Free Cooling, depending on what temperature on the Comfort Window settings, as shown in FIG. 7, was last reached by the indoor sensor. If the indoor sensor last reached the High Temperature setpoint, the Economizer goes into Free Cooling Mode and attempts to, only if the current outdoor conditions permit, bring outdoor air indoors for the purpose of cooling off the house. If the indoor sensor last reached the Low Temperature setpoint, the Economizer goes into Free Heating Mode and attempts, only if current outdoor conditions permit, to bring outdoor air indoors for the purpose of heating up the house. In this embodiment, depending on what mode the Economizer is set to, the controller will attempt to bring the indoor temperature towards different user-predefined temperatures.

When the Economizer is in Free Cooling Mode but not in "Auto" mode (ie: the Mechanical system="Cool" and the Economizer Mode="On"), it attempts to bring the indoor temperature to the Low Comfort Window temperature setpoint 6120 as shown in FIG. 7. If the Economizer is able to successfully bring the indoor temperature down or substantially down to the low temperature setpoint 6120, then this will be referred to herein as "Extra Free Cooling". In the Extra Free Cooling operation, the Economizer can push further down into the Comfort Window settings (FIG. 7) using additional outdoor cooling to provide additional cooling and power efficiency by only operating one or more fans in lieu of running the compressor. In the Extra Free Cooling operation, the indoor temperature will not oscillate around the cooling setpoint, but instead it will oscillate approximately 1 to 2 degrees above the Low Comfort Window setpoint 6120, since there is a delta that the Economizer pays attention to prior to turning on again, thus allowing it to stay within the Comfort Window settings. Here, the controller of the present invention allows the user to set a customizable Extra Free Cooling parameter via the Comfort Window settings shown in FIG. 7.

Alternatively, if the Economizer is in Free Heating Mode and the Economizer is not in "Auto" mode (i.e: the Mechanical system="Heat" and the Economizer Mode="On"), then the Economizer attempts to bring the indoor temperature to the High Comfort Window temperature setpoint 6110, as shown in FIG. 7. If the Economizer is able to bring the indoor temperature up or substantially up towards the High Comfort Window setpoint 6110, then this will be referred to herein as "Extra Free Heating". Here, the controller of the present invention allows the user to set a customizable Extra Free Heating parameter via the Comfort Window settings shown in FIG. 7.

In either the Extra Free Cooling or Extra Free Heating, the controller is attempting to go all the way down, or substantially close to, the low temperature setpoint 6120 while in Extra Free Cooling and all the way up to the high temperature setpoint 6110 while in Extra Free Heating so that the house can more easily be preloaded for the day. For example, this is beneficial in a scenario when a user wakes up on a cool brisk morning by using this cool outdoor air to cool the house down to the low temperature setpoint 6120 so that when the house warms up during the heat of the day, the compressor does not need to operate as much since the house has been already pre-cooled using the Free Cooling from earlier in the day. Here, either the Extra Free Cooling or Extra Free Heating operations save more energy than just the normal operation of the Economizer. Further, since the current embodiment is actually calculating enthalpy and comparing enthalpy as one of the conditions for when the Economizer runs, there are scenarios where the controller is not only traversing the temperature spectrum in order to get Extra Free Cooling, but also traverses the humidity spectrum to accommodate for enthalpy changes.

In another embodiment, if the Economizer is in "Auto" mode, we change the target point slightly to be ¾ deep into the comfort window zone for either mode. For example, if the Mechanical system is set to "Auto" and Economizer mode set to "Auto", and the Economizer is currently Free Cooling (ie: the last Mechanical System that ran was the compressor), then the Economizer will try to cool the indoor temperature (if outdoor conditions permit) according to the following formula:

$$CW\ LowSetPoint\ Temp\ 6120+0.25*(CW\ HighSetPoint\ Temp\ 6110-CW\ LowSetPoint\ Temp\ 6120). \quad (14)$$

Here, this is taken as a precautionary method where the controller does not cool the house down so much when the Mechanical System is in "Auto" mode using outdoor air so that this does not cause the heater to activate. This is particularly true when there are no program entries scheduled to run and the Comfort Window settings are governing the thermostat. Similarly, if the Mechanical system is set to "Auto" and the Economizer mode is set to "Auto, and the Economizer is currently Free Heating (ie: the last Mechanical System that ran was the heater), then the Economizer will try to heat the indoor temperature (if outdoor conditions permit) according to the following formula:

$$CW\ HighSetPoint\ Temp\ 6110-0.25*(CW\ HighSetPoint\ Temp\ 6110-CW\ LowSetPoint\ Temp\ 6120). \quad (15)$$

In other embodiments, other areas of the Comfort Window may be targeted, such as closer to the middle or center portion of the Comfort Window graph during Auto mode. In still other embodiments, any temperature point or combinations of temperature and humidity within the Comfort Window can be targeted. Furthermore, other embodiments can include targeting differing percentages into the comfort window settings, depending on climate zones, latitudes (location), seasons, months, etc.

In another embodiment, when the Economizer is in "Auto" mode and the Mechanical mode is "Off", we will follow formulas 14 and 15 as previously stated, except the controller can also use the temperature the indoor sensor reached last. For example, if the CW High Temp 6110 was reached last, then the Economizer will go into Extra Cooling mode and if the CW Low Temp 6120 was reached last, then the Economizer will go into Extra Heating mode.

Figure 20:
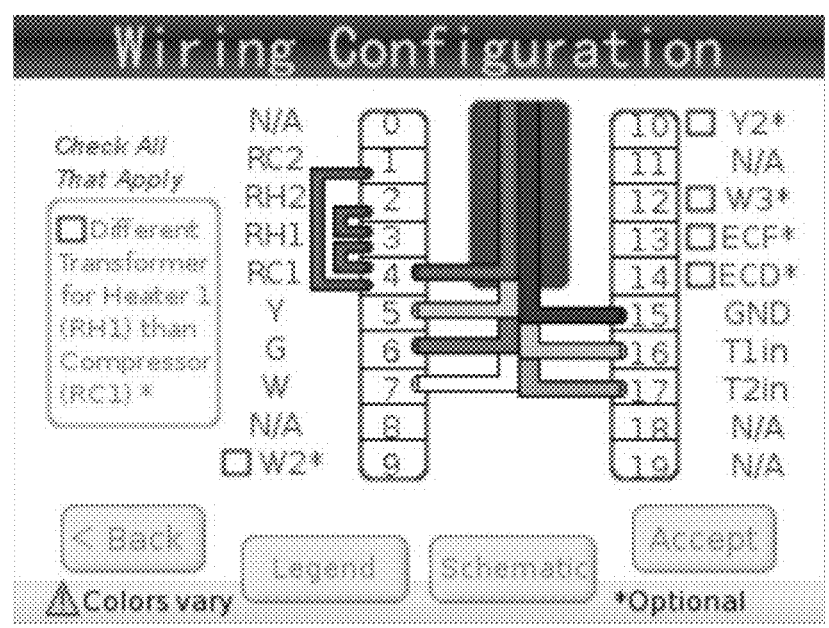
FIG. 20 provides an illustrative but non-limiting example of a wiring diagram for the controller.

There are two methods that allow the user to enter the Economizer mode on the controller. First, he or she must check one or both checkboxes in the dynamic wiring configuration setup page, either the ECF or ECD checkbox, as shown in FIG. 20. This tells the thermostat that the Economizer is linked to the controller. Then, as a result of checking one or both of the aforementioned checkboxes, the Economizer Mode icon 2030 as shown in FIG. 2 will appear.

In addition to using dampers for the purpose of running the economizer feature, controller 10 controls multiple dampers to route airflow through different branches of the ducting system for the purpose of creating multiple independently controlled zones. The controller 10 includes inputs for up to 7 independent temperature sensors, although it is contemplated that any number of inputs could be supported for as many temperature/humidity inputs as are necessary to support the number of zones required. The controller 10 also includes 14 outputs for use in controlling relays of the type needed to control the type of dampers used to open and close airflow in ducting. Each output can be assigned via software and described to the user in the user manual for a given embodiment of the controller 10, including 7 outputs of which can be used to control zone dampers. In one embodiment, controller 10 equalizes each zone's current temperature/humidity point so that each zone falls within the Comfort Window box 1100. This optimizes the control of the home's comfort such that each zone more precisely falls within the Comfort Window box 1100. In another embodiment, separate comfort windows can be created and maintained, one for each zone. In certain embodiments, these can be created and/or maintained directly on the controller 10 or separately via smart phone interfaces, web interfaces, etc.

In addition to the ability to view current comfort conditions and set comfort settings such as temperature and humidity, the controller 10 also includes the ability to control certain HVAC components for the explicit purpose of keeping the current indoor temperature and humidity levels within the Comfort Window settings. Such HVAC components include but are not limited to compressors, heat pumps, furnaces (both gas and electric), fans, humidifiers, and dehumidifiers. The controller 10 is also capable of using a compressor as a dehumidifier, rather than controlling a separate dedicated dehumidifier. Controller 10 controls a humidifier/dehumidifer in order to keep the current condition node 1110 within the Comfort Window box 1100 by first comparing the current indoor humidity with the maximum and minimum relative humidity settings (6130 and 6140). If the humidity is outside of this range, the controller will run either the humidifier or the dehumidifier until the current condition node 1110 is within the Comfort Window box 1100. As an alternate embodiment, especially for the common case in the winter when the indoor temperature is less than the Comfort Window LowSetpoint temperature (6120) and the relative humidity is less than the MaxRH comfort window setting (6130), the controller 10 monitors the current condition node 1110 as it moves upwards and to the right on the Comfort Window 1100; as it moves, the controller 10 adjusts the amount of time that it runs the humidifier such that controller 10 moves the current condition node 1110 into the Comfort Window box 1107 as quickly and as efficiently as possible. Furthermore, as yet another alternate embodiment, the controller 10 monitors the comfort window node 1110 and as it moves, the controller 10 adjusts the amount of time that it runs the humidifier such that the controller 10 moves the current condition node 1110 into the Comfort Window box 1107 through a perpendicular trajectory of the movement such that the current condition node 1110 follows a straight line path to the closest point on the edge of the Comfort Window box 1107.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

The invention claimed is:

1. A device configured to control one or more components of an HVAC system, the device comprising:
a display;
a controller in communication with the display, wherein the controller is configured to receive one or more user defined environmental settings;
one or more environmental sensors in communication with the controller, wherein the environmental sensors detect one or more environmental conditions;
the controller further configured to output a visual indication on the display for the detected environmental conditions with respect to the user defined environmental settings, wherein the visual indication comprises:
a bounded region, wherein the bounded region is comprised of one or more borders, and wherein the one or more borders at least partially represent the user defined environmental settings;
a node displayed within the bounded region indicating the detected environmental conditions, wherein a position of the node is configured to adjust relative to the bounded region; and
one or more icons representing the detected environmental conditions.

2. The device of claim 1, wherein the bounded region represents user comfort level.

3. The device of claim 1, wherein the detected environmental conditions and user defined environmental settings are comprised of temperature and humidity.

4. The device of claim 1, wherein the node is displayed according to one or more of: within the perimeter of the bounded region, outside the perimeter of the bounded region, and overlapping the bounded region.

5. The device of claim 1, wherein the bounded regions define an enclosed parallelogram configuration.

6. The device of claim 1, wherein the user defined environmental settings are comprised of one or more of: a high temperature set point, low temperature set point, high relative humidity set point, and low relative humidity set point.

7. The device of claim 1, further comprising user defined schedules indicating preferred temperature set points for one or more time periods within one or more days of a week.

8. The device of claim 1, further comprising user defined schedules indicating preferred relative humidity set points for one or more time periods within one or more days of a week.

9. The device of claim 7 or 8 wherein the controller is configured to revert to the user defined environmental settings if there are no user defined schedules indicating preferred temperature set points for any given day of the week or time period during any given day of the week.

10. The device of claim 1, further comprising an algorithm configured to control the entry of outdoor air into one or more indoor spaces, wherein the algorithm incorporates the user defined environmental settings and detected environmental conditions to regulate the flow of the outdoor air into the one or more indoor spaces.

11. The device of claim 10, wherein the algorithm is configured to further control one or more dampers and one or more fans.

12. The device of claim 10, wherein the algorithm is configured to operate the one or more dampers and one or more fans in lieu of one or more heaters or one or more compressors.

13. A non-transitory computer readable medium storing thereon a program, which when executed by a computer, causes the computer to perform a method of controlling a HVAC system, the method comprising:
   receiving one or more first environmental conditions;
   receiving one or more second environmental conditions;
   controlling one or more components of the HVAC system, wherein the controlling depends at least partially on the received first environmental conditions and the received second environmental conditions, and wherein the controlling is at least partially represented in a graphical display, wherein the graphical display comprises:
      a bounded region, wherein the configuration of the bounded region is at least partially defined by the second environmental conditions;
      a node displayed within the bounded region, wherein a position of the bounded region is adjustable relative to the node; and
      one or more icons, wherein the one or more icons are at least partially defined by the first environmental conditions.

14. The method of claim 13, wherein the node is displayed according to one or more of: within the one or more bounded regions, outside the one or more bounded regions, and overlapping the one or more bounded regions.

15. The method of claim 13, wherein the node is at least one of: a dot, circle, oval, ellipsoid, square, box, rectilinear shape, pyramid, polygon having three or more sides, photo, picture, image, video, or computer generated animation.

16. The method of claim 13, wherein the first environmental conditions are comprised of one or more of: a temperature, relative humidity, wind speed, and heat index.

17. The method of claim 13, wherein the controlling further comprises keeping the node within the perimeter of the one or more bounded regions.

18. The method of claim 13, wherein the second environmental conditions are comprised of one or more of: a high temperature set point, low temperature set point, high relative humidity set point, and low relative humidity set point.

19. The method of claim 13, further comprising receiving user defined schedules for one or more temperature set points for one or more time periods in one or more days of a week.

20. The method of claim 13, further comprising receiving user defined schedules for one or more relative humidity set points for one or more time periods in one or more days of a week.

21. The method of claim 13, further comprising controlling the entry of outdoor air into one or more indoor areas by at least partially using the first and second environmental conditions to regulate the flow of the outdoor air into the one or more indoor spaces.

22. The method of claim 13, further comprising overriding the second environmental conditions by receiving one or more parameters, wherein the parameters are comprised of one or more of: a time period, qualifying or conditional requirement, temperature set point, and temperature differential.

23. The method of claim 13, wherein the controlling of the one or more components at least partially depends on the position of the node with respect to the bounded regions.

* * * * *